(12) United States Patent
Halabian et al.

(10) Patent No.: US 10,362,573 B2
(45) Date of Patent: Jul. 23, 2019

(54) METHOD AND SYSTEM FOR MULTI-PROTOCOL TRANSMISSIONS

(71) Applicant: TELEFONAKTIEBOLAGET LM ERICSSON (PUBL), Stockholm (SE)

(72) Inventors: Hassan Halabian, Ottawa (CA); Alfred Schmidt, Kanata (CA); Roland Smith, Nepean (CA)

(73) Assignee: TELEFONAKTIEBOLAGET LM ERICSSON (PUBL), Stockholm (SE)

(*) Notice: Subject to any disclaimer, the term of this patent is extended or adjusted under 35 U.S.C. 154(b) by 50 days.

(21) Appl. No.: 14/907,849

(22) PCT Filed: Dec. 23, 2015

(86) PCT No.: PCT/IB2015/059955
§ 371 (c)(1),
(2) Date: Jan. 27, 2016

(87) PCT Pub. No.: WO2017/089873
PCT Pub. Date: Jun. 1, 2017

(65) Prior Publication Data
US 2017/0257865 A1 Sep. 7, 2017

Related U.S. Application Data

(60) Provisional application No. 62/260,362, filed on Nov. 27, 2015.

(51) Int. Cl.
*H04W 4/00* (2018.01)
*H04W 72/04* (2009.01)
(Continued)

(52) U.S. Cl.
CPC ......... *H04W 72/0453* (2013.01); *H04L 5/003* (2013.01); *H04L 27/2602* (2013.01);
(Continued)

(58) Field of Classification Search
CPC ............. H04W 72/0453; H04W 88/06; H04L 27/2607; H04L 27/2627
(Continued)

(56) References Cited

U.S. PATENT DOCUMENTS

| 8,582,485 | B2* | 11/2013 | Fischer | H04L 5/0023 |
| | | | | 370/312 |
| 2002/0065047 | A1* | 5/2002 | Moose | H04L 5/0048 |
| | | | | 455/67.11 |

(Continued)

OTHER PUBLICATIONS

International Search Report from corresponding application PCT/IB2015/059955, 4 pages.

*Primary Examiner* — Mang Hang Yeung
(74) *Attorney, Agent, or Firm* — Christopher & Weisberg, P.A.

(57) ABSTRACT

Methods and systems for multi-protocol transmissions in shared spectrum are disclosed. According to principles described herein, a wireless transmitter is configured to generate subcarriers or symbol information from one OFDM technology using subcarriers of another OFDM technology. With this approach, a wireless transmitter configured to transmit OFDM symbols using subcarriers and a subcarrier frequency spacing associated with one OFDM protocol can also be configured to transmit OFDM symbols associated with another OFDM protocol which normally uses different subcarriers and a different subcarrier frequency spacing. In one application, an LTE transmitter uses LTE subcarriers to generate 802.11 (e.g. Wi-Fi) subcarrier or symbol information that can be understood by Wi-Fi receivers, for example to reserve the channel for a certain duration, to indicate a transmission time associated with an on-going and/or upcoming symbol transmission or to create a carrier sense indication, for example, to cause Wi-Fi receivers and other radio technologies to consider the channel as busy.

28 Claims, 14 Drawing Sheets

(51) Int. Cl.
*H04L 5/00* (2006.01)
*H04L 27/26* (2006.01)
*H04W 88/06* (2009.01)

(52) U.S. Cl.
CPC ...... *H04L 27/2607* (2013.01); *H04L 27/2627* (2013.01); *H04W 88/06* (2013.01)

(58) Field of Classification Search
USPC ........................................................ 370/330
See application file for complete search history.

(56) References Cited

U.S. PATENT DOCUMENTS

| | | | |
|---|---|---|---|
| 2005/0120097 A1* | 6/2005 | Walton | H04B 7/2643 709/220 |
| 2008/0032630 A1* | 2/2008 | Kim | H04L 25/0224 455/45 |
| 2012/0033589 A1* | 2/2012 | Zheng | H04W 99/00 370/280 |
| 2013/0208587 A1 | 8/2013 | Bala et al. | |
| 2015/0223075 A1 | 8/2015 | Bashar et al. | |
| 2015/0223244 A1* | 8/2015 | Tabet | H04W 72/12 370/329 |
| 2015/0256308 A1 | 9/2015 | Ma et al. | |
| 2015/0304077 A1 | 10/2015 | Cao et al. | |
| 2017/0156075 A1* | 6/2017 | Harada | H04W 24/10 |

* cited by examiner

LTE OFDM

Wi-Fi OFDM

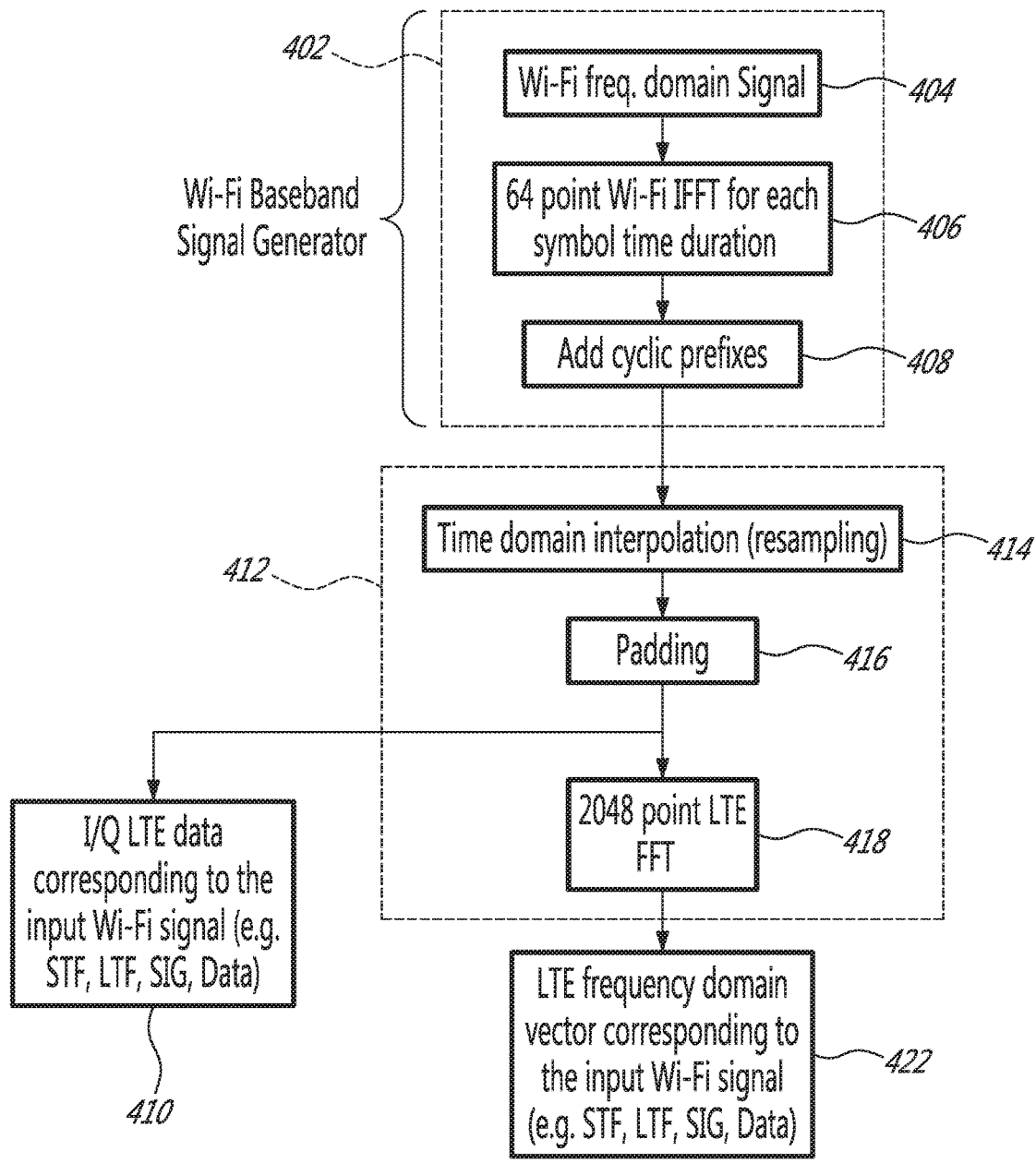

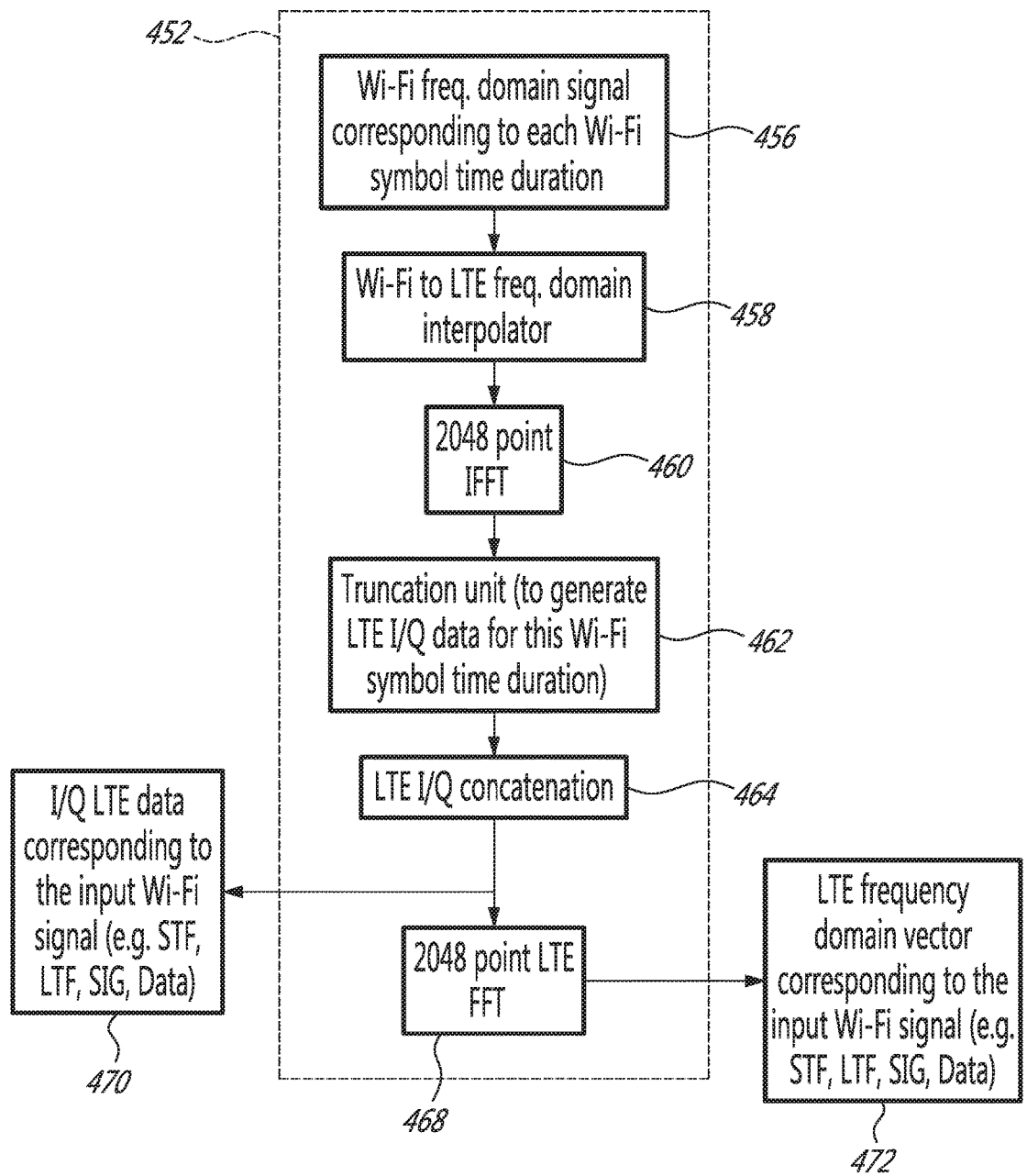

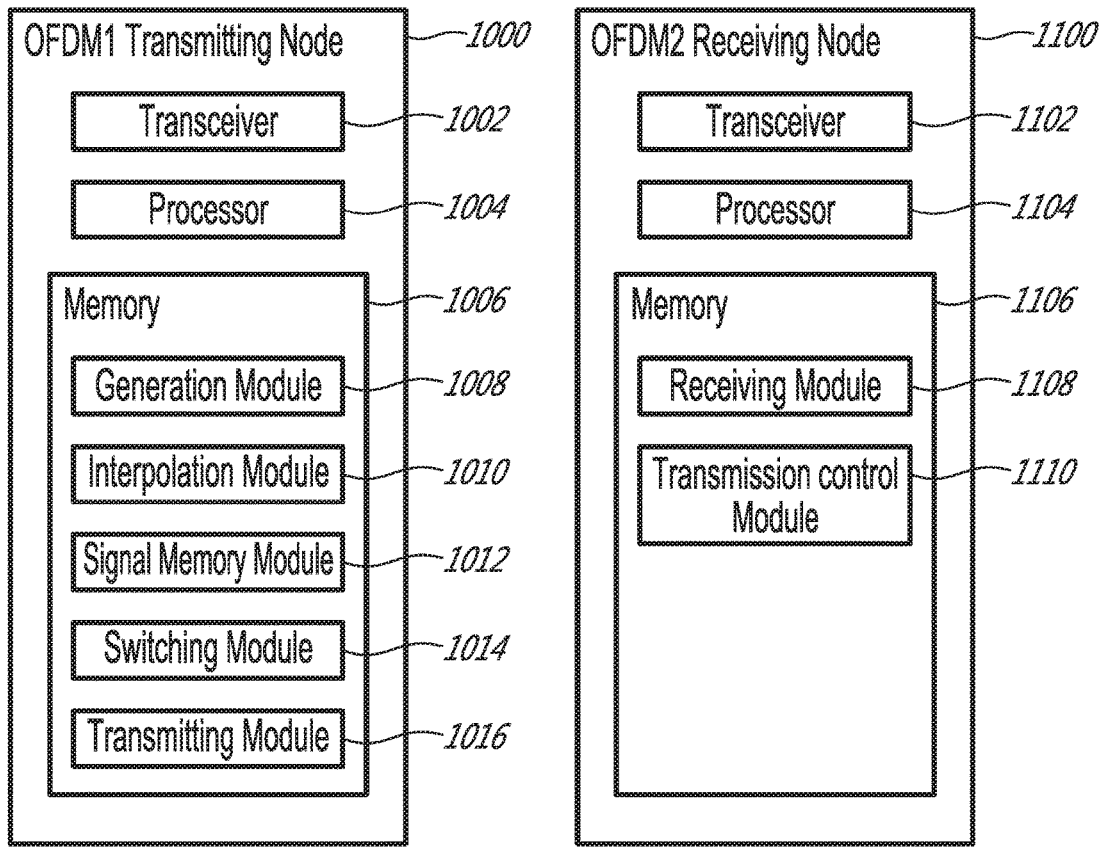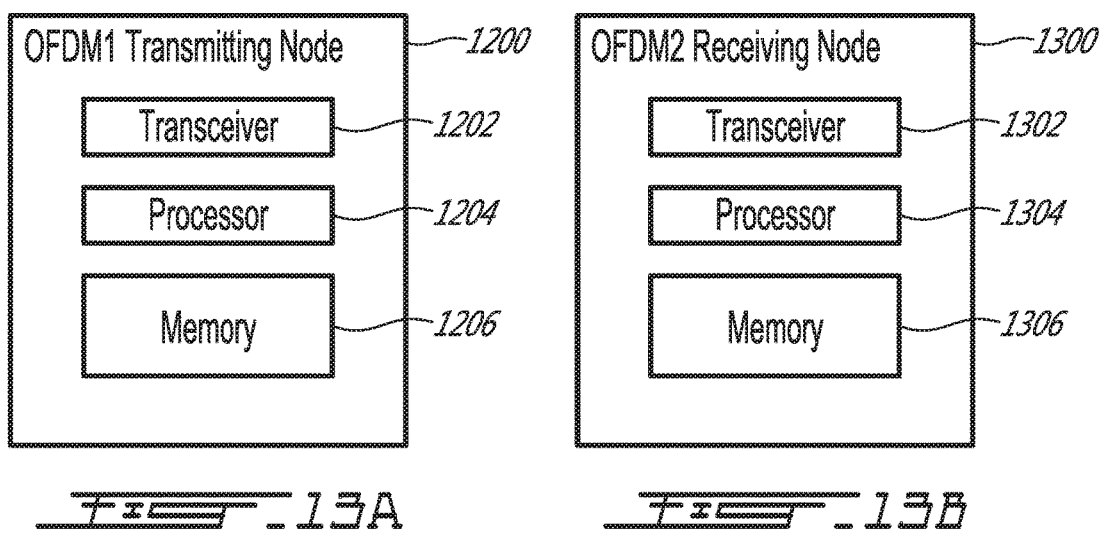

METHOD AND SYSTEM FOR MULTI-PROTOCOL TRANSMISSIONS

TECHNICAL FIELD

The present disclosure relates to wireless communication systems and in particular a method and system for multi-protocol transmissions in wireless communication networks.

BACKGROUND

Orthogonal frequency-division multiplexing (OFDM) has become a key encoding method used by many communications technologies ranging from wireline to wireless technologies. In fact, OFDM use is pervasive, being employed by many technologies including, but not limited to, wired communications such as Digital Subscriber Loop (DSL), Asymmetric DSL (ADSL) and Very-high-bit-rate DSL (VDSL) broadband access technology over Plain Old Telephone Service (POTS) copper wiring, Digital Video Broadcasting (DVB), Power Line Communications (PLC), ITU-T G.hn for home wiring LANs, telephone modems, DOCSIS—Data Over Cable System Interface Specification for broadband delivery, MoCA—Multimedia Over Coax Alliance home networking, and wireless communications including IEEE 802.11 (e.g. Wi-Fi), HIPERLAN, Digital TV, Personal Area Networks (PAN), and Ultra Wideband Networks (UWB).

OFDM and its multiple access variant OFDMA continue to find increasing applications, for example in $3^{rd}$ Generation Partnership Project (3GPP)-based wireless networks such as Long Term Evolution (LTE) and Evolved Universal Mobile Telecommunications System Terrestrial Radio Access (E-UTRA) networks, but also in IEEE-based networks such as Mobile Broadband Wireless Access (MBWA, also referred to as IEEE 802.20). Next Generation mobile networks are planning to use OFDM as the platform for this new and exciting product evolution, and even the Wireless Gigabit Alliance (WiGig) plans to use OFDM in the 60 GHz frequency band to enable conference room cell sizes to achieve 100 Gigabits per second (Gbps) data rates.

Although these technologies are all based on OFDM, they have significant differences in their technology implementations. OFDM is a digital modulation technique that uses frequency division multiplexing to create multiple orthogonal sub-carriers to carry parallel data streams. Sub-carriers are modulated using conventional modulation schemes such as Binary Phase Shift Keying (BPSK) or Quadrature Amplitude Modulation (QAM) with defined symbol rates enabling multiple parallel data streams to be carried.

The detailed implementations for these various technologies are all quite different, largely driven by channel limitations or restrictions, and desired operational features. For example, 802.11a Wi-Fi employs short 3.2 microsecond (µs) symbols (with 0.4 or 0.8 µs for the cyclic prefix), and 52 carriers spaced at 312.5 kHz to create a high speed data channel capable of withstanding the low dispersion experienced in short reach indoor channels which Wi-Fi APs typically address, while LTE typically employs longer 66.7 µs symbols (or 71.4 µs with the cyclic prefix) with 15 kHz spaced subcarriers to address significant inter-symbol interference issues typical of long reach outdoor cellular channels.

Implementations differ by symbol time and sub-carrier spacing, but also by many other physical layer parameters including the number of sub-carriers, channel spacing, Fast Fourier Transform (FFT) size, number and operation of pilot tones, convolutional codes employed, Forward Error Correction (FEC) design, sub-carrier modulation schemes, time-interleaving, equalizer operation, and Multiple-Input Multiple-Output (MIMO) operation to name a few. Moreover, with the Medium Access Control (MAC) layer defining how the OFDM based physical medium is used by higher layer applications, OFDM designs are inherently complex and specific to a particular OFDM technology. As a result, the implementation of interworking functions with other OFDM based technologies has proven to be very difficult.

Nevertheless, with the explosion of wireless technologies in unlicensed spectrum such as the Unlicensed National Information Interchange (U-NII) bands managed by the Federal Communications Commission (FCC) in the United States, there is a desire to see upcoming technologies such as LTE work together to share this spectrum fairly with incumbents such as 802.11 (e.g. Wi-Fi) the dominant technology, and provide a positive end user experience. 3GPP and some to come 5G licensed networks will shortly begin trials to offer services in unlicensed bands. License Assisted Access for Long Term Evolution (LAA-LTE or LAA), as the first example, has recently demonstrated cabled operation at Mobile World Congress in March of 2015 using the 5 GHz band. Product rollouts are planned in 2016 and 2017. However, concerns over interoperability of these different technologies have been raised, driven by expectations of wide scale deployment of LTE radios into the unlicensed bands.

Since the FCC first made available spectrum in the 5 GHz band for U-NII operation in 1997, an etiquette protocol for medium access was developed for Wi-Fi systems which can be generalized into three rules:

1. Listen Before Talk (LBT)—Do not use the channel if Radio Frequency (RF) energy above a threshold is detected,
2. Carrier Sense—Do not use the channel if a Wi-Fi carrier (pilot tones) is detected, and
3. NAV Timer—do not use the channel while the Network Allocation Vector (NAV) timer is counting down to zero.

In Wi-Fi systems, the Clear Channel Assessment (CCA) function employs these simple etiquette rules to ensure that many Wi-Fi devices can share the same unlicensed channel fairly, and avoid transmission collisions which may have deleterious effects to both the interferer and interferee.

With the introduction of new 3GPP-based cellular technologies such as LTE and soon to be 5G into the unlicensed bands, an expanded etiquette will be required. Wi-Fi, as the main incumbent technology, has a defined etiquette. However, Wi-Fi does not address the complexities and requirements of 3GPP systems. Although they both use OFDM and both support a number of common features at the physical layer, 3GPP and Wi-Fi are fundamentally different.

One of the most fundamental differences is synchronization. Wi-Fi operates asynchronously by applying the etiquette rules and sending/receiving packets when the medium is free. In contrast, 3GPP operates synchronously and employs advanced scheduling algorithms to maximize channel utilization, and therefore is not burdened with etiquette rules. As a result, 3GPP is able to carry higher traffic loads efficiently i.e. in a way that maximizes the use of the valuable frequency channel resources.

Because of this and other notable differences in OFDM implementation, 3GPP-based technologies are not currently designed to support a sharing etiquette, such as that which Wi-Fi supports.

Different possible solutions have been proposed so far claiming to have the potential for improving fair sharing. One such proposal includes implementing a power-based LBT detect threshold. With this proposal, the LTE radio would monitor energy on the channel and consider it free if the received signal strength indication (e.g. RSSI) is lower than that threshold. However, this proposal does not address the variability of cell sizes due to unlicensed band interference. Also, in some implementations, the threshold is fairly large (−62 dBm) and limits the cell size. Depending on the channel conditions, there is no guarantee that the LTE radio will detect a transmitted signal above the threshold and this ultimately may result in a higher collision count and lower throughput.

Other proposals contemplate using a Wi-Fi receiver in the LTE radio to monitor and detect Wi-Fi pilot tones and/or transport LTE data using Wi-Fi packets. However, these proposals would involve significant hardware and software development and would not be backward compatible to existing LTE radios currently deployed. Moreover, this proposal combines transceivers which are fundamentally different to try and create a coordinate design. In doing so, it mixes the performance and regulatory aspects of two separate and independent radio transceivers, making the solution extremely complex to design, verify, and have certified since all of the key design parameters such as power control, AGC, power spectral density, PAR reduction techniques, and PA linearization techniques such as digital pre-distortion are now operating on two separate PHY devices.

Accordingly, to address some or all of the drawbacks noted above, there is a need for improved method and systems to facilitate co-existence in shared spectrum.

SUMMARY

Methods and systems for multi-protocol transmissions in shared spectrum are disclosed. According to principles described herein, a wireless transmitter is configured to generate subcarriers or symbol information from one OFDM technology using subcarriers of another OFDM technology. With this approach, a wireless transmitter configured to transmit OFDM symbols using subcarriers and a subcarrier frequency spacing associated with one OFDM protocol can also be configured to transmit OFDM symbols associated with another OFDM protocol which normally uses different subcarriers and a different subcarrier frequency spacing.

In one application, an LTE transmitter uses LTE subcarriers to generate 802.11 (e.g. Wi-Fi) subcarrier or symbol information that can be understood by Wi-Fi receivers, for example to reserve the channel for a certain duration, to indicate a transmission time associated with an on-going and/or upcoming symbol transmission or to create a carrier sense indication, for example, to cause Wi-Fi receivers and other radio technologies to consider the channel as busy. Depending on the type of Wi-Fi subcarrier or symbol information transmitted, other applications are possible.

The embodiments described are primarily in relation to the generation of Wi-Fi subcarriers/symbol information by an LTE transmitter. However, the same approach is equally applicable to other OFDM technologies such as for example 802.15 technologies (e.g. ZigBee). Generally, the principles described herein are applicable to generating subcarriers or symbol information from one OFDM technology using subcarriers of another OFDM technology. In some embodiments, the principles described herein are applicable to generate any possible signal to the extent allowed by the spectral bandwidth available to the OFDM transmitter. In addition, the principles are equally applicable to other non-OFDM technologies or to generate non-OFDM signals. For example, the principles described herein may be employed to generate IEEE 802.11b CCK signals, using subcarriers or symbol information from one OFDM technology. The principles described within may even be applied to signal generation for applications yet undetermined, a possible example being in-building "radar", using specialized signals to detect and characterize in-building objects for the purpose of high precision location tracking.

In some implementations, the principles described herein address the specifics of Wi-Fi systems, and how the carrier sense mechanism operate addressing the set of carrier functionality necessary to cause a Wi-Fi receiver to determine or indicate the channel as busy. Embodiments describe how Wi-Fi subcarriers/symbol information may be transmitted using LTE OFDM subcarriers so that the channel may be considered as busy, both in a preamble type mode (e.g. stand-alone transmission of Wi-Fi preamble or header information) but also as part of a regular LTE transmission whereby LTE Resource Blocks or symbols are allocated to represent Wi-Fi pilot tones or symbol information.

In other implementations, the principles described herein extend the discussion to consider OFDM power level changes which would enable 3GPP LTE systems to present a relatively constant carrier sense to Wi-Fi systems, while carrying user traffic so as to ensure that the LTE data transmitted over an unlicensed band or channel is not inadvertently interfered with by a Wi-Fi transmitter.

In one broad aspect, there is provided a method for a wireless OFDM transmitter configured for transmission of a first set of OFDM symbols using a base plurality of subcarriers having a base subcarrier frequency spacing defining a base symbol duration. The method includes transmitting, using the base plurality of subcarriers, a second set of OFDM symbols during one base symbol duration where each of the second set of OFDM symbols includes a second Cyclic Prefix (CP) and has a second symbol duration smaller than the base symbol duration.

In one implementation, the method further includes transmitting, using the base plurality of subcarriers, a first set of OFDM symbols where each of the first set of OFDM symbols includes a base CP and has a base symbol duration. In another implementation, the method further includes transmitting, using the base plurality of subcarriers, a third set of OFDM symbols during one base symbol duration, where each of the third set of OFDM symbols includes a third CP and has a third symbol duration smaller than the base symbol duration.

In yet another implementation, the first set of OFDM symbols includes data associated with a first OFDM communication protocol and the second set of OFDM symbols includes data associated with a second OFDM communication protocol different from the first OFDM communication protocol. In yet another implementation, the first OFDM communication protocol comprises an LTE protocol and the second OFDM communication protocol comprises an 802.11 protocol.

In yet another implementation, the transmitting of the second set of OFDM symbols is based on a predetermined OFDM signal in one of a time domain and a frequency domain where the predetermined ODFM signal contains data associated with the second OFDM communication protocol. In yet another implementation, the transmitting of the second set of ODFM symbols is based on a predetermined set of modulation values for the base plurality of subcarriers where the predetermined set of modulation values correspond to data associated with the second OFDM communication protocol.

In yet another implementation, the method further includes generating for transmission in the second set of OFDM symbols an OFDM signal in one of a time domain and a frequency domain where the OFDM signal being generated uses a second plurality of subcarriers different from the base plurality of subcarriers and where the second plurality of subcarriers has a second subcarrier frequency spacing defining the second symbol duration. In yet another implementation, the OFDM signal generated is associated with the second OFDM communication protocol and the method further includes interpolating the OFDM signal generated using the base plurality of subcarriers to produce an OFDM signal to form the second set of OFDM symbols.

In yet another implementation, the second set of OFDM symbols includes control data associated with the second OFDM communication protocol where the control data is indicative of one of a transmission length, transmission time, transmission type and a channel reservation time associated with at least one of the first and second set of OFDM symbols. In yet another implementation, the control data comprises one of Short Training Field (STF) data, Long Training Field (LTF) data, Signal Field (SIG) data. In yet another implementation, the second set of OFDM symbols includes packet data associated with the second OFDM communication protocol where the packet data being indicative of one of a transmission length, transmission time, transmission type and a channel reservation time associated with at least one of first and the second set of OFDM symbols. In yet another implementation, the packet data comprises a Clear To Send (CTS) frame having a timer value indicative of a transmission end time associated with the at least one of the first and the second set of OFDM symbols.

In yet another implementation, the first and second sets of OFDM symbols are transmitted in sequence, as one of contiguous transmissions and non-contiguous transmissions. In yet another implementation, the first and second sets of OFDM symbols are transmitted as non-contiguous transmissions separated by a delay and wherein the second set of OFDM symbols includes data is indicative of a time for completing transmission of the first set of OFDM symbols.

In yet another implementation, the second set of OFDM symbols includes an OFDM indication indicative of one of an OFDM type, OFDM mode and an OFDM parameter, a symbol duration, a CP duration, a number of subcarriers, a subcarrier spacing, a subcarrier modulation format, and a subcarrier frequency set associated with the first set of OFDM symbols.

In another broad aspect, there is provided an OFDM transmitter configured for transmission of a first set of OFDM symbols using a base plurality of subcarriers having a base subcarrier frequency spacing defining a base symbol duration. The OFDM transmitter includes circuitry containing instructions which, when executed, cause the transmitter to perform any of the method implementations described above.

In yet another broad aspect, there is provided a non-transitory computer readable memory configured to store executable instructions for an OFDM transmitter configured for transmission of a first set of OFDM symbols using a base plurality of subcarriers having a base subcarrier frequency spacing defining a base symbol duration. The executable instructions when executed by a processor cause the transmitter to perform any of the method implementations described above.

In yet another broad aspect, there is provided an OFDM transmitting node configured for transmission of a first set of OFDM symbols using a base plurality of subcarriers having a base subcarrier frequency spacing defining a base symbol duration. The OFDM transmitting node includes a transceiver, a processor and a memory containing a transmitting module configured to transmit, using the base plurality of subcarriers, a second set of OFDM symbols during one base symbol duration where each of the second set of OFDM symbols includes a second Cyclic Prefix (CP) and has a second symbol duration smaller than the base symbol duration.

In one implementation, the transmitting module is further configured to transmit, using the base plurality of subcarriers, a first set of OFDM symbols where each of the first set of OFDM symbols includes a first CP and has a first symbol duration equal to the base symbol duration.

In another implementation, the transmitting module is further configured to transmit, using the base plurality of subcarriers, a third set of OFDM symbols during one base symbol duration where each of the third set of OFDM symbols includes a third CP and has a third symbol duration smaller than the base symbol duration.

In yet another implementation, the first set of OFDM symbols includes data associated with a first OFDM communication protocol and the second set of OFDM symbols includes data associated with a second OFDM communication protocol different from the first OFDM communication protocol. In yet another implementation, the first OFDM communication protocol is an LTE protocol and the second OFDM communication protocol is an 802.11 protocol.

In yet another implementation, the transmitting module is further configured to transmit the second set of OFDM symbols based on a predetermined OFDM signal in one of a time domain and a frequency domain, where the predetermined ODFM signal contains data associated with the second OFDM communication protocol. In yet another implementation, the transmitting module is further configured to transmit the second set of ODFM symbols based on a predetermined set of modulation values for the base plurality of subcarriers, where the predetermined set of modulation values corresponds to data associated with the second OFDM communication protocol.

In yet another implementation, the memory further includes a generation module configured to generate for transmission in the second set of OFDM symbols a second OFDM protocol signal containing data associated with a second OFDM protocol in one of a time domain and a frequency domain where the second OFDM protocol signal being generated uses a second plurality of subcarriers different from the base plurality of subcarriers, and where the second plurality of subcarriers has a second subcarrier frequency spacing defining the second symbol duration. In yet another implementation, the memory further includes an interpolation module configured to interpolate the second OFDM protocol signal generated using the base plurality of subcarriers to produce a first OFDM protocol signal to form the second set of OFDM symbols. In yet another implementation, the method further includes a signal memory module configured to store the first OFDM protocol signal to form the second set of OFDM symbols. In yet another implementation, the first OFDM protocol signal is the predetermined OFDM signal.

In yet another implementation, the memory further includes a switching module configured to determine when data associated with the second OFDM communication protocol needs to be transmitted and based on that determination, to route a first OFDM protocol signal containing the data associated with the second OFDM communication protocol to the transmitting module for transmission as the second set of OFDM symbols. In yet another implementation, the first OFDM protocol signal is in one of a time domain and a frequency domain. In yet another implementation where the first OFDM protocol signal is in a frequency domain, the switching module is configured to route the first OFDM protocol signal to a Inverse Fast Fourier Transform (IFFT) module in the transceiver to perform a first OFDM protocol IFFT function on the first OFDM protocol signal for transmission as the second set of OFDM symbols via a Radio Frequency (RF) module in the transceiver. In yet another implementation where the first OFDM protocol signal is in a time domain, the switching module is configured to route the first OFDM protocol signal to the Radio Frequency (RF) module in the transceiver for transmission as the second set of OFDM symbols.

In yet another implementation, the second set of OFDM symbols includes control data associated with the first OFDM communication protocol, where the control data is indicative of one of a transmission length, transmission time, transmission type and a channel reservation time associated with at least one of the first and second set of OFDM symbols. In yet another implementation, the control data includes one of Short Training Field (STF) data, Long Training Field (LTF) data, Signal Field (SIG) data. In yet another implementation, the second set of OFDM symbols includes packet data associated with the second OFDM communication protocol, where the packet data is indicative of one of a transmission length, transmission time, transmission type and a channel reservation time associated with at least one of first and the second set of OFDM symbols. In yet another implementation, the packet data includes a Clear To Send (CTS) frame having a timer value indicative of a transmission end time associated with the at least one of the first and the second set of OFDM symbols.

In yet another implementation, the first and second sets of OFDM symbols are transmitted in sequence, as one of contiguous transmissions and non-contiguous transmissions. In yet another implementation, the first and second sets of OFDM symbols are transmitted as non-contiguous transmissions separated by a delay, where the first set of OFDM symbols includes data is indicative of a time for completing transmission of the first set of OFDM symbols.

In yet another implementation, the second set of OFDM symbols includes an OFDM indication indicative of one of an OFDM type, OFDM mode and an OFDM parameter, a symbol duration, a CP duration, a number of subcarriers, a subcarrier spacing, a subcarrier modulation format, and a subcarrier frequency set associated with the first set of OFDM symbols.

Advantageously, the present principles do not require a separate Wi-Fi transmitter as required in existing co-existence proposals. In some implementations, the Wi-Fi subcarriers/symbol information may be generated using hardware configured for LTE transmissions and therefore help ensure the Wi-Fi transmissions meet requirements imposed on LTE systems such as, for example, power spectral density, and maximum transmission power. In other implementations, the interference free cell size is increased by at least 20 dB, for example from −62 dBm (free channel threshold) to over −82 dBm which is the sensitivity level considered standard for Wi-Fi systems using 6 Mbps Binary Phase Shift Keying (BPSK). In yet other embodiments, the cell size is increased by a 10 fold factor.

BRIEF DESCRIPTION OF THE DRAWINGS

A more complete understanding of the present disclosure, and the attendant advantages and features thereof, will be more readily understood by reference to the following detailed description when considered in conjunction with the accompanying drawings in which like reference designators refer to like elements and wherein:

FIG. 8 illustrates a block diagram example for the signal generator and time-domain interpolator in the LTE node of FIG. 7A configured in accordance with the principles described herein;

FIG. 9 illustrates a block diagram example for the frequency-domain interpolator in the LTE node of FIG. 7B configured in accordance with the principles described herein;

FIGS. 12A-12B show a block diagram of exemplary embodiments of OFDM transmitting and receiving nodes configured in accordance with principles described herein, and FIGS. 13A-13B show a block diagram of other exemplary embodiments of OFDM transmitting and receiving nodes configured in accordance with the principles described herein.

DETAILED DESCRIPTION

The present disclosure is directed to methods and systems for multi-protocol transmissions in shared spectrum. e.g. unlicensed bands or band normally used for unlicensed access. The principles described herein are applicable to generating subcarriers or symbol information associated with one OFDM technology using another OFDM technology. The description that follows describes how nodes in a first or base OFDM network (e.g. a License Assisted Access (LAA)—Long Term Evolution (LTE) Radio Access Network (RAN)) can transmit subcarrier and/or symbol information which can be detected by wireless devices in one or more second OFDM network(s) such as for example, a Wireless (e.g. Wi-Fi) Local Area Network (WLAN). However, those having ordinary skill in the relevant art will readily appreciate that the principles described herein may equally apply to other types of networks.

For example, the first OFDM network may also include other 3$^{rd}$ Generation Partnership Project (3GPP) networks (e.g. Universal Mobile Telecommunications System (UMTS), LTE-Advanced (LTE-A)), LTE-Unlicensed (LTE-U), 4$^{th}$ Generation (4G), 5$^{th}$ Generation (5G) or other future generations of a 3GPP communication network infrastructure. More generally, the first OFDM network may include any current or future wireless network infrastructure configured to generate subcarriers or symbol information associated with a different OFDM technology, with or without a licensed anchor band (so called "standalone" or single carrier access network).

Similarly, the second OFDM network(s) described herein primarily as WLANs (e.g. Wi-Fi) may also include other types of 802 networks such as a Wireless Personal Area Networks (WPAN) or a Wireless Metropolitan Area Networks (WMAN). However, the second OFDM network(s) may also include wireless networks that use a different OFDM technology such as for example 802.15 networks (e.g. ZigBee). More generally, the second wireless network (s) may include any OFDM network that uses a subcarrier spacing equal to or greater than the subcarrier spacing used in the first OFDM network. This is intended to include OFDM networks which are variations of the OFDM technology used in the first OFDM network but with a greater subcarrier spacing (e.g. a second LTE network with a subcarrier spacing greater than the carrier spacing of a first LTE network). For clarity and as used herein, the term WLAN or Wi-Fi is used to cover all of these possibilities for the second OFDM network(s).

Figure 1:
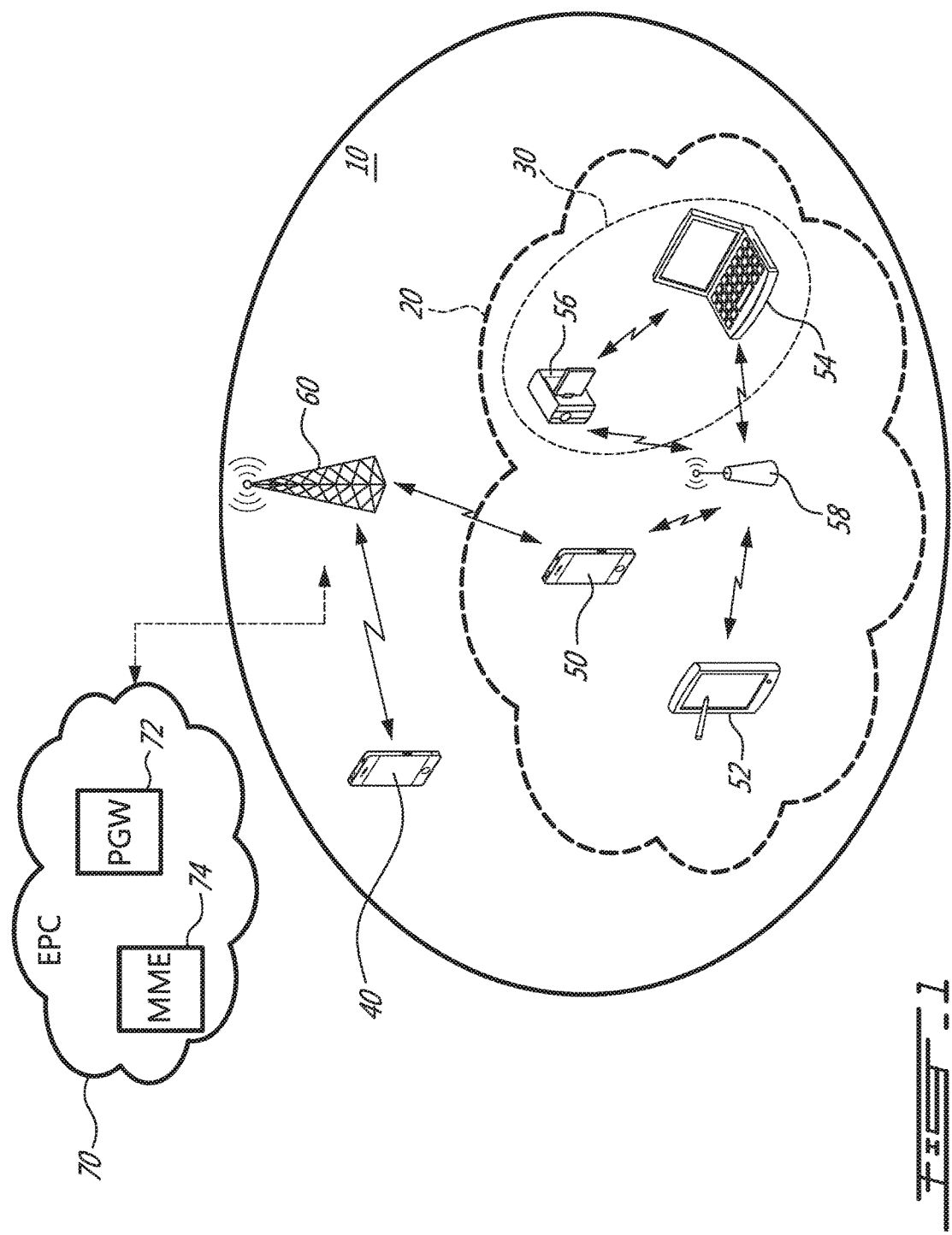
FIG. 1 illustrates one example of a Long Term Evolution (LTE) Radio Access Network (RAN) and Wireless Local Area Networks (WLANs) configured to share unlicensed spectrum resources, in accordance with the principles described herein.

Referring now to FIG. 1, there is shown one example of an LAA-LTE RAN 10 (an example of the first OFDM network) in which an access node 60 is configured to transmit subcarrier and/or symbol information which can be detected by wireless devices 50, 52, 54, 56, 58 operating in WLANs 20, 30 (examples of a second OFDM network). As is conventional for LAA operation, the unlicensed band is used to operate a (secondary) carrier to add capacity to a (primary) carrier operating in licensed spectrum (e.g. an LTE carrier). Operation of the primary licensed carrier may be under the control of the access node 60 or another node in the LAA-LTE RAN 10.

The access node 60 is an eNodeB but in other implementations, the access node 60 may be a Node B (NB), evolved Node B (eNB), base station, base station controller (BSC), radio network controller (RNC), relay, donor node controlling relay, base transceiver station (BTS), transmission point, transmission node, remote RF unit (RRU), remote radio head (RRH), a node in a distributed antenna system (DAS), or a memory management unit (MMU). Generally, the access node 60 is configured to control transmissions to or from UEs in the LTE RAN 10 but other nodes in the LTE RAN 10, a Core Network (CN) 70 or in a network outside of a RAN/CN infrastructure (e.g. an Internet Protocol (IP) node in an IP network) may be configured for that purpose. In other implementations, a wireless device or UE (for example, a relay node UE) may be configured to transmit subcarrier and/or symbol information which can be detected by devices that use a different OFDM technology (e.g. devices in the WLANs 20, 30). It is to be understood that the functionality described herein in relation to nodes that are configured to transmit such subcarrier or symbol information in a wireless network may also equally apply to wireless devices (e.g. UEs) configured as such.

In FIG. 1, the access node 60 provides wireless devices within its coverage (e.g. devices 40, 50) with access to network services in one more core networks 70, in this example, an Evolved Packet Core (EPC) network which includes a Mobility Management Entity 74 and a Packet Data Network (PDN) Gateway (PGW) 72. Each wireless device 40, 50 is configured for wireless communication in the LAA-LTE RAN 10 (e.g. as a User Equipment (UE) and may be of any type, including, for example a wireless terminal (also known as a mobile station, a mobile phone ("cellular" phone), a desktop, laptop, netbook, and/or tablet computer, a laptop embedded equipment (LEE), laptop mounted equipment (LME), or a portable device such as an e-book reader, watch, digital music and/or video player, camera, game controller and/or device but also may be a computing-like device such as a heart monitoring implant, biochip transponder, automobile, sensor, modem, thermostat, and/or other home or car appliance generally referred to as an Internet of Things (IoT) device, a machine type communication (MTC) device (also known as a machine-to-machine (M2M) or device-to-device (D2D) device.

In the example of FIG. 1, the LAA-LTE RAN 10 shares the unlicensed band with WLANs 20, 30 for transmissions involving at least some of the wireless devices in its coverage (e.g. wireless device 50). Generally, the WLANs 20, 30 may each include any number of wireless devices communicating directly or via an Access Point (AP) with other devices in the same or different networks. In the example of FIG. 1, WLAN 20 is shown to include WLAN devices 52, 54, AP 58 as well as wireless device 50 while WLAN 30 includes WLAN devices 54 and 56. Other network configurations for WLANs 20, 30 or other types of networks or devices which may share unlicensed spectrum resources with device 50 in the LAA-LTE RAN 10 are possible.

As is conventional, devices 50, 52, 54 and AP 58 in WLAN 20 and devices 54, 56 in WLAN 30 (herein generically referred to as WLAN or Wi-Fi devices) are configured to share a band of spectrum using some form of media access method and/or transmissions based on contention. As is well-known, there are many examples of such contention-based approaches. Examples include Listen-Before-Talk (LBT), Carrier Sense Multiple Access (CSMA)—with Collision Detection (CSMA-CD), CSMA with Collision Avoidance (CSMA-CA), etc. Using a contention-based method, a WLAN device 50, 52, 54, 56, 58 will try to determine whether another transmission is in progress in the channel or band used. This determination may be based on the detection of a carrier wave, signal or energy in the channel of interest. If a carrier or energy is detected in the channel of interest (in another fully or partially overlapping channel), the WLAN device 50, 52, 54, waits for the transmission in progress to finish before initiating its own transmission.

In the example of FIG. 1, the LAA-LTE RAN 10 may include wireless devices 40 in a location outside the coverage of WLANs 20, 30, and with which spectrum resources are not shared. As a result, the wireless devices 40, 50 described in the embodiments herein may (but do not need to) be configured for operation on multiple different wireless networks. In the example of FIG. 1, wireless device 50 is configured as a dual-mode device (i.e. configured as a UE for operation in the LAA-LTE RAN 10 as well as a WLAN device for operation in WLANs 20, 30) while wireless device 40 is configured as a UE for operation in the LAA-LTE RAN 10 only. For clarify, the principles of the present disclosure apply whether or not wireless devices 40, 50 in the LAA-LTE RAN 10 are configured as single-mode or multi-mode devices.

Figure 2A:
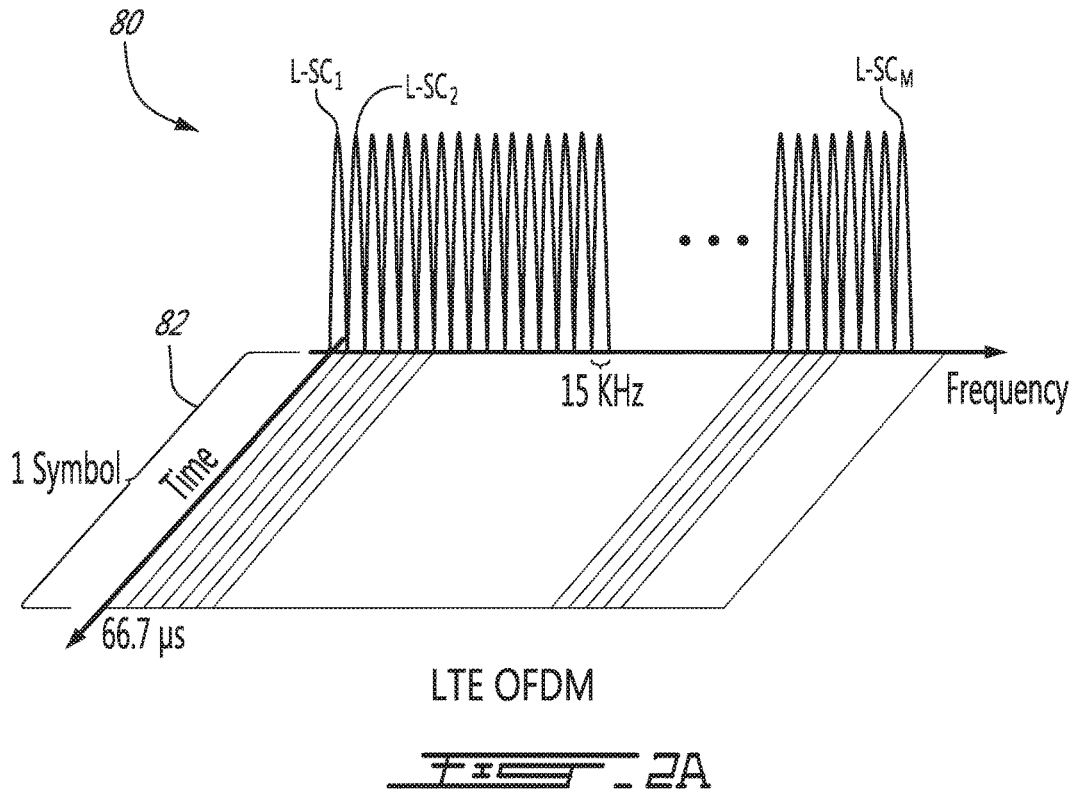
FIG. 2A-B illustrates an example of LTE subcarriers and Wi-Fi subcarriers used in the LTE RAN and WLANs of FIG. 1, in accordance with the principles described herein.

3GPP systems such as the LAA-LTE RAN 10 of FIG. 1 typically operate outdoors, usually from high powered macros cell sites designed to cover ranges up to several kilometers. The resulting coherence bandwidth of the channel is very small as the delay spread (i.e. the impulse response of the channel) can be quite large due to distant reflections from building and other environmental factors. To address this issue, 3GPP systems break the available bandwidth into many narrower sub-carriers or sub-channels and transmit the data in parallel streams. FIG. 2A shows a time-frequency diagram 80 of a set of LTE sub-channels (only a subset shown) used in a channel of the LTE RAN 10 of FIG. 1. The LTE sub-channels are 15 KHz wide and correspond to a set of LTE sub-carriers L-SC$_{1-M}$, typically 1200 (M=1200) for a 20 MHz channel. In that example, each LTE subcarrier L-SC$_{1-M}$ is modulated using varying levels of QAM modulation, e.g. QPSK, QAM, 64QAM or possibly higher orders depending on signal quality. Each OFDM symbol 82 is therefore a linear combination of the instantaneous signals on each of the sub-carriers L-SC$_{1-M}$ in the channel. Because data is transmitted in parallel rather than serially, LTE symbols 82 are generally much longer than symbols on single carrier systems of equivalent data rate. In the example of FIG. 2A, each LTE symbol 82 is 66.7 microseconds (μs) long and is preceded by a 4.7 μs cyclic prefix (CP) (not shown), which is used to reduce Inter-symbol Interference (ISI). The total symbol length (including the CP) is 71.4 μs.

Figure 2B:
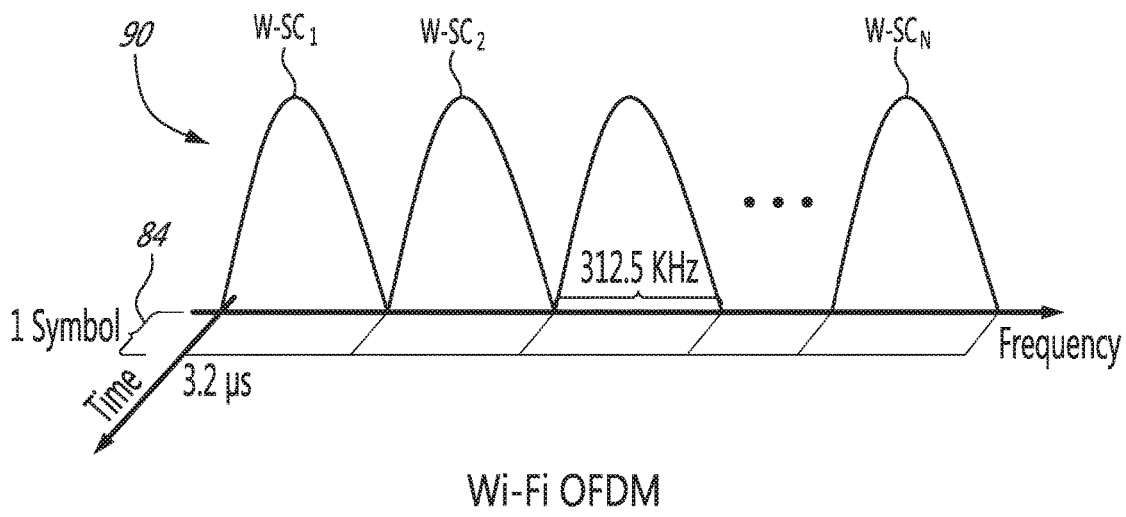

In contrast, Wi-Fi systems operate (mostly) indoors, usually from low power APs designed to cover ranges up to 50 or 100 meters. The resulting coherence bandwidth of the channel is large, as the delay spread (e.g. the impulse response of the channel) is usually very short, typically less than 500 nanoseconds (ns). As a result, Wi-Fi systems use wider 312.5 KHz sub-channels. FIG. 2B shows a time-frequency diagram 90 of a set of Wi-Fi sub-channels (only a subset shown) used in a channel of the WLANs 20, 30 of FIG. 1. The Wi-Fi sub-channels correspond to a set of Wi-Fi sub-carriers W-SC$_{1-N}$, typically 52 (N=52) in a 20 MHz channel, which are spaced apart by 312.5 kHz. Because of the larger sub-channel spacing, Wi-Fi symbols 84 are generally much shorter than LTE symbols 82. In the example of FIG. 2A, each Wi-Fi symbol 82 is 3.2 μs long and is preceded by a 0.8 μs cyclic prefix (CP) (not shown) for a total duration of 4 μs.

Understanding the differences in, for example the number of carriers, the carrier spacing and the symbol time duration, it is possible for one base OFDM system (denoted as OFDM1) configured to transmit information using its defined set of (base) subcarriers to also be configured to encode subcarrier or symbol information of another OFDM system (denoted as OFDM2) in a way that such information can be decoded by receivers configured in accordance with that other system. In some implementations, the subcarrier spacing $\Delta f_1$, symbol duration $T_1 = k_1/\Delta f_1$ and system bandwidth $BW_1$ of the OFDM1 system and those of the OFDM2 system ($\Delta f_2$, $T_2 = k_2/\Delta f_2$, and $BW_2$) are such that:

$$\Delta f_1 < \Delta f_2 \tag{1}$$

$$T_1 > T_2 \tag{2}$$

$$BW_1 = (M^* \Delta f_1) \geq BW_2 = (N^* \Delta f_2) \tag{3}$$

where $k_1$ and $k_2$ are integer values, which are typically set to 1,
M is the number of OFDM1 subcarriers, and
N is the number of OFDM2 subcarriers.

In other implementations, an OFDM1 transmitter is configured to generate and transmit subcarrier and/or symbol information of any OFDM2 system that uses a subcarrier spacing larger (or substantially larger, e.g. by a factor of 10 or 20) than the OFDM1 subcarrier spacing. Stated another way, the OFDM1 transmitter is configured to generate and transmit subcarrier and/or symbol information of any OFDM2 system that uses a symbol duration smaller (or substantially smaller, e.g. by a factor of 10 or 20) than the OFDM1 symbol duration. In yet other implementations, the OFDM1 transmitter is configured to generate and transmit subcarrier and/or symbol information of any OFDM2 system that has a system bandwidth that is smaller or equal to the LTE system bandwidth. In typical LTE and Wi-Fi systems for example, the LTE subcarrier spacing is smaller than the Wi-Fi subcarrier spacing (which means the Wi-Fi symbol duration is smaller than the LTE symbol duration) and the Wi-Fi system bandwidth is smaller than the LTE system bandwidth. As such, it is possible for an LTE transmitter to encode and transmit Wi-Fi information as a set of Wi-Fi symbols that can be recovered by a Wi-Fi receiver. In some implementations, in addition to being configured to generate and transmit Wi-Fi and LTE symbols, the LTE transmitter may also be configured to generate subcarrier and/or symbol information of another OFDM technology.

In other implementations, an LTE transmitter (e.g. the access node 60 of FIG. 1) can use LTE subcarriers L-SC$_{1-M}$ to generate 802.11 (e.g. Wi-Fi) subcarrier or symbol information that can be understood by Wi-Fi receivers, for example to reserve the channel for a certain duration, to indicate a transmission time associated with an on-going and/or upcoming symbol transmission or to create a carrier sense indication, for example, to cause Wi-Fi receivers and other radio technologies to consider the channel as busy. The embodiments described below are primarily in relation to the generation of Wi-Fi subcarriers/symbol information in an LTE transmitter. However, it is understood that the same approach is equally applicable to other OFDM technologies such as for example 802.15 technologies (e.g. ZigBee). Generally, the principles described herein are applicable to generating subcarriers or symbol information from one OFDM technology using another OFDM technology.

Figure 3:
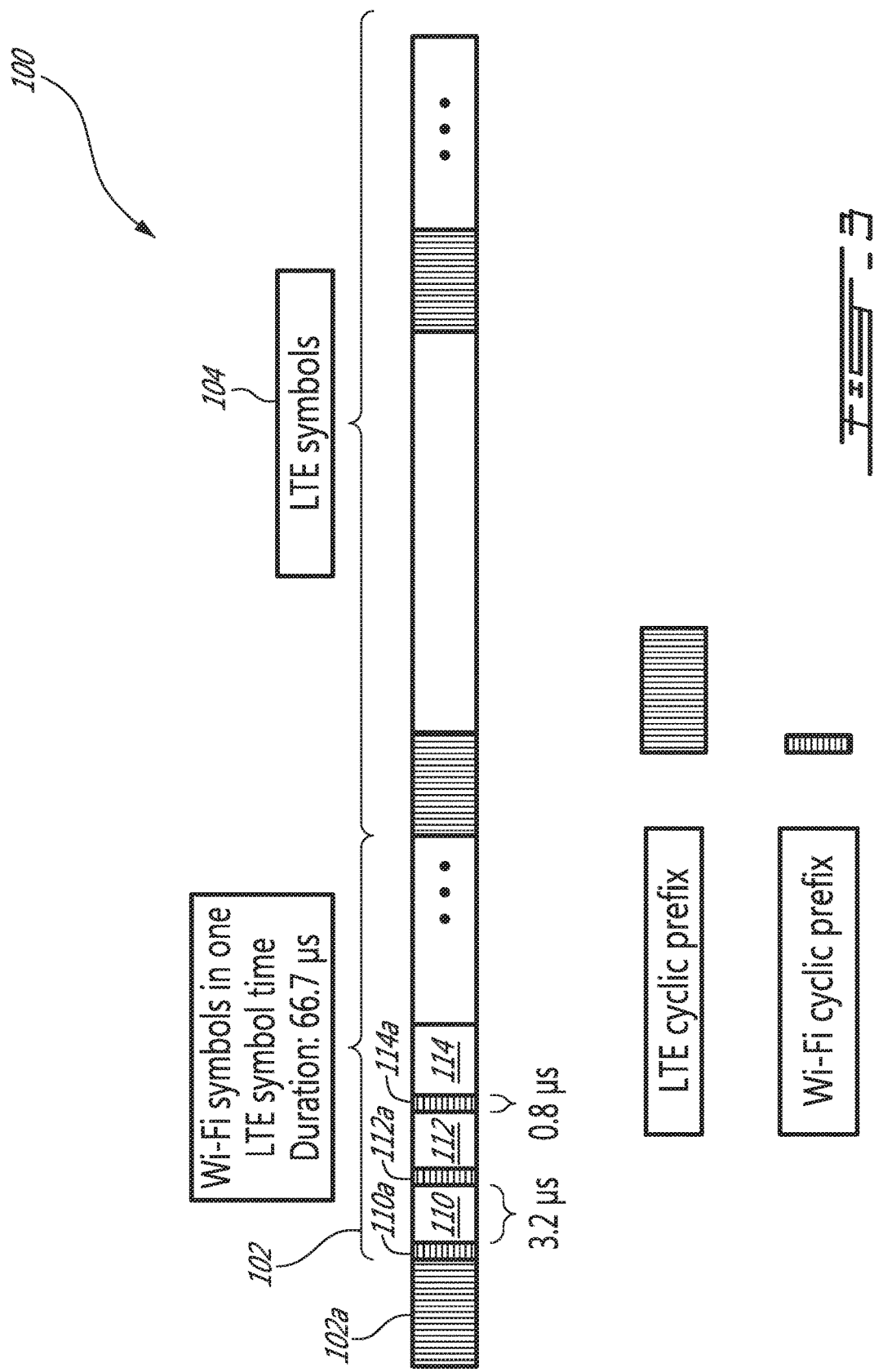
FIG. 3 illustrates a timing diagram showing an example of Wi-Fi symbols transmitted by an LTE node in the LTE RAN of FIG. 1, in accordance with the principles described herein.

FIG. 3 illustrates a timing diagram 100 showing an example of a symbol transmission by an LTE transmitting node (e.g. the access node 60 in the LTE RAN 10 of FIG. 1), in accordance with the principles described herein. In this example, the access node 60 is configured to transmit Wi-Fi information, for example Wi-Fi header and/or packet data to indicate its current use of a (unlicensed) channel shared with devices in the WLANs 20, 30 and/or to reserve the channel for a certain amount of time (further details below). The Wi-Fi information is modulated by the access node 60 in the form of a set of one or more Wi-Fi symbols 110, 112, 114 (only three shown) and transmitted during the duration of one LTE symbol 102 (e.g. 66.7 μs). In order to be properly decoded by devices in WLANs 20, 30, each Wi-Fi symbol 110, 112, 114 includes a respective CP 110a, 112a, 114a (e.g. 0.8 μs) and has a symbol duration (e.g. 3.2 μs) that conforms to the duration expected by devices in the WLANs 20, 30. In the example of FIG. 3, the number of Wi-Fi symbols 110, 112, 114 is designed to fit into one LTE symbol duration 102

(e.g. after an LTE symbol preamble or CP 102a) but in other implementations, the number of Wi-Fi symbols 110, 112, 114 is substantially less than one LTE symbol duration 102. In yet other implementations, the access node 60 uses up to sixteen Wi-Fi symbols 110, 112, 114 in a 66.7 μs LTE symbol time duration. In yet other implementations, the access node 60 uses some of the Wi-Fi symbols 110, 112, 114 for Wi-Fi header data and the rest for Wi-Fi packet or frame data, the size of which depends on the Wi-Fi modulation rate used. In yet other implementations, the Wi-Fi symbols 110, 112, 114 are organized in multiple sets to span over multiple LTE symbol durations where each set is configured to fit in the duration of one LTE symbol. In yet other implementations, the first Wi-Fi symbol set is preceded by an LTE CP (e.g. CP 102a), but subsequent Wi-Fi symbol sets are transmitted without an LTE CP to ensure proper recovery by Wi-Fi receivers.

In the example of FIG. 3, the Wi-Fi transmission is followed by conventional LTE symbols 104 (only one shown) which can be decoded and received by conventional LTE receivers (e.g. UEs 40, 50). In some implementations, the Wi-Fi information contained in the Wi-Fi symbols 110, 112, 114 and intended for devices in the WLANs 20, 30 is indicative of a transmission time, length, type associated with and/or a channel reservation time necessary for transmitting the Wi-Fi symbols 110, 112, 114, the LTE symbols 104 or a combination of both. Advantageously, with this approach, the access node 60 can generate a Wi-Fi header or even one or more complete Wi-Fi packets.

In some implementations, the access node 60 generates Wi-Fi symbols 110, 112, 114 to contain a Wi-Fi header or a Clear-To Send (CTS) packet such as a "CTS-to-Self" packet to reserve the channel with a "virtual carrier sense", enabling devices in the WLANs 20, 30 to receive this header/packet information down to −82 dBm or lower and refrain from transmitting until after the LTE transmission (e.g. the LTE symbols 104) has been sent. Moreover, in some implementations, by generating and transmitting both the Wi-Fi symbols 110, 112, 114 and the LTE transmission 104, the access node 60 can apply the same (LTE) processing functions such as filtering, PAR, digital pre-distortion, PSD management, RMS power control, etc., to the generation and transmission of both the Wi-Fi symbols 110, 112, 114 and the LTE transmission 104 which follows.

It is important to note that different Wi-Fi header and/or packet data may be used for different applications. In one implementation for example, the access node 60 may use Wi-Fi symbols 110, 112, 114 to send PROBE REQUEST packets to detect nearby Wi-Fi APs. In another implementation, the access node 60 uses the Wi-Fi symbols 110, 112, 114 to send disassociation or de-authentication packets to Wi-Fi Stations (clients) in an attempt to move them to the LTE RAN 10. Using the principles described herein, the access node 60 can use to Wi-Fi symbols 110, 112, 114 to send other types of Wi-Fi packets or frames including for example NULL packets, Wi-Fi sounding packets, LWA packets, Point Coordination Function (PCF) beacons, etc.

Figure 4:
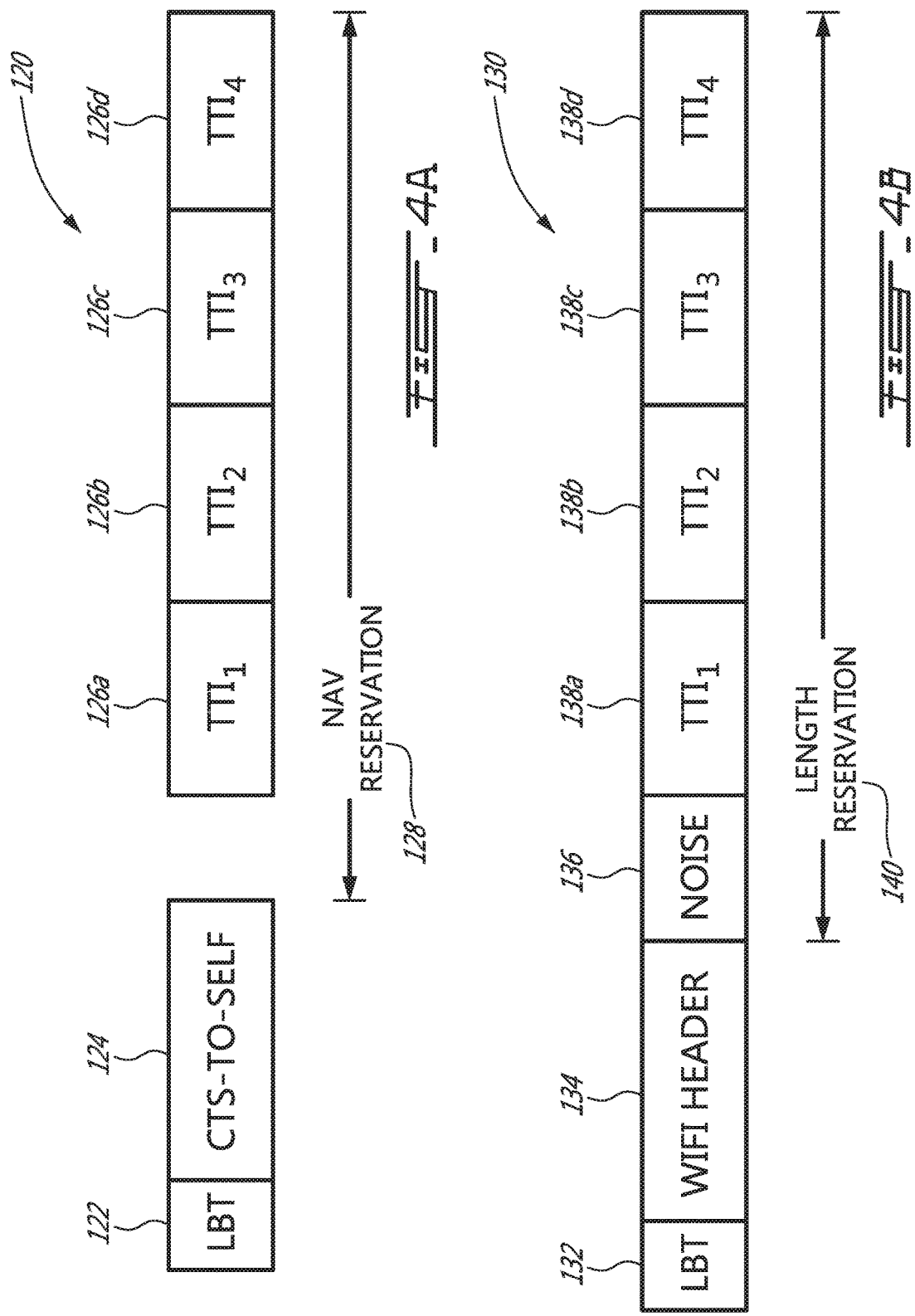
FIG. 4A-B illustrates timing diagram examples of Wi-Fi transmissions by an LTE node in the LTE RAN of FIG. 1 for channel reservation in an unlicensed band in accordance with the principles described herein.

FIGS. 4A-B show timing diagram examples of two different Wi-Fi transmissions 124, 134 the access node 60 can use to reserve the channel for a subsequent LTE symbol transmission (shown as Transmission Time Intervals (TTIs) 126a-d, 138a-d). Each of these Wi-Fi transmissions 124, 134 has a duration that fits within one LTE symbol but as noted above, the Wi-Fi transmissions 124, 138 may span multiple LTE symbols in other implementations. In the example of FIG. 4A, a Wi-Fi CTS-to-Self packet 124 is used to reserve the channel for transmitting a set of LTE TTIs 126a-d (only four shown) while in the example of FIG. 4B, a Wi-Fi header 134 is used for TTIs 138a-d.

According to principles of the present disclosure, each of the CTS-To-Self packet 124 and header 134 contains a channel reservation indication indicating an amount of time during which the access node 60 intends to use the channel. In some implementations, the reservation indication prevents listening devices (e.g. devices in the WLANs 20, 30 that have received and demodulated the indication) to perform any transmission until the reservation time has expired.

As described below in more detail, there are many possibilities for the channel reservation indication. In the example of FIG. 4A, the channel reservation indication is a Network Allocation Vector (NAV) indication in the CTS-To-Self packet 124. In some implementations, the NAV indication is a NAV timer value defining how long the channel will be reserved. In some implementations, the NAV timer value is indicative of a time required to transmit the CTS packet, the LTE TTIs 126a-d (e.g. NAV reservation time 128) and/or a combination thereof. In other implementations, the NAV timer value is an end time of the LTE TTI 126a-d transmission. The devices that receive and demodulate the CTS packet will refrain from transmitting until a timer set to the NAV timer value expires. In yet other implementations, the channel reservation indication is included in a different field of the CTS-to-Self packet 124. Generally, any packet data or any field of a Wi-Fi packet may be used for the channel reservation indication. In other implementations, the channel reservation indication is a value indicative of any one of a transmission length, time or type or a channel reservation time associated with the CTS-to-Self packet 124, the LTE symbols and/or both. Other possibilities exist for the channel reservation indication.

In the example of FIG. 4B, the channel reservation indication is a length reservation indication or other control data in the Wi-Fi header 134 representing an octet count associated with the LTE TTIs 138a-d. In other implementations, the length reservation indication (or control data) is a time duration required for transmitting the Wi-Fi header 134, the LTE TTIs 138a-d (e.g. length reservation time 140) and/or a combination thereof. In yet other implementations, the length reservation indication is an end time of the LTE TTI 138a-d transmission. In yet other implementations, the Wi-Fi header 134 and the LTE TTIs 138a-d may be viewed as a combined packet transmission 130 where the LTE TTIs 138a-d (and possibly other information) form the packet data payload with a length that corresponds to the length reservation indication. In those implementations, Wi-Fi receivers (e.g. devices in WLANs 20, 30) recover the Wi-Fi header 134 and refrain from using the channel until the packet data payload (e.g. the LTE TTIs 138a-d) has been completely transmitted while LTE receivers (e.g. the access node 60) are configured to receive and demodulate only the LTE TTIs 138a-d (the Wi-Fi header may be unrecoverable).

Depending on the nature of the channel reservation indication used, the Wi-Fi and LTE transmissions are either contiguous or non-contiguous transmissions. For example, the access node 60 may, in some implementations, initiate the LTE transmission immediately after completing the Wi-Fi transmission or alternatively, wait after a certain delay (e.g. as in FIG. 4A). In other implementations such as the example shown in FIG. 4B, the access node 60 transmits noise (or some RF power) during that delay to maintain the transmit power envelope and prevent Wi-Fi devices to assume the channel is free.

In some implementations, the access node 60 may continue to use the channel beyond the time duration or end time indicated by the channel reservation indication. For example, the access node 60 may also be configured for an additional transmission following TTIs 126a-d or TTIs 138a-d. The additional transmission may be an additional set of LTE TTIs or some other transmission (e.g. a Wi-Fi transmission) and is contiguous with the preceding TTIs 126a-d, 138a-d to prevent Wi-Fi devices from transmitting during the additional transmission. In those implementations, the channel reservation indication indicates how long the channel is reserved for the LTE TTIs 126a-d, 138a-d but not for the additional transmission.

In some implementations, the access node 60 performs a channel availability check using a contention-based method, for example Listen-Before-Talk (LBT) 122, 132 to determine whether another transmission is in progress in the channel or band used. This determination may be based on the detection of a carrier wave, signal or energy in the channel or band of interest (e.g. with a −62 dBm threshold). If during that time, a carrier or energy is detected in the band or channel of interest (in another fully or partially overlapping channel or band), the access node 60 waits for the transmission in progress to finish before initiating its own transmission. Alternatively, if no carrier or energy is detected, the access node 60 (immediately) transmits either the CTS-To-Self packet 124 or header information 134 and completes the subsequent LTE transmission (TTIs 126a-d or 138a-d).

Figure 5:
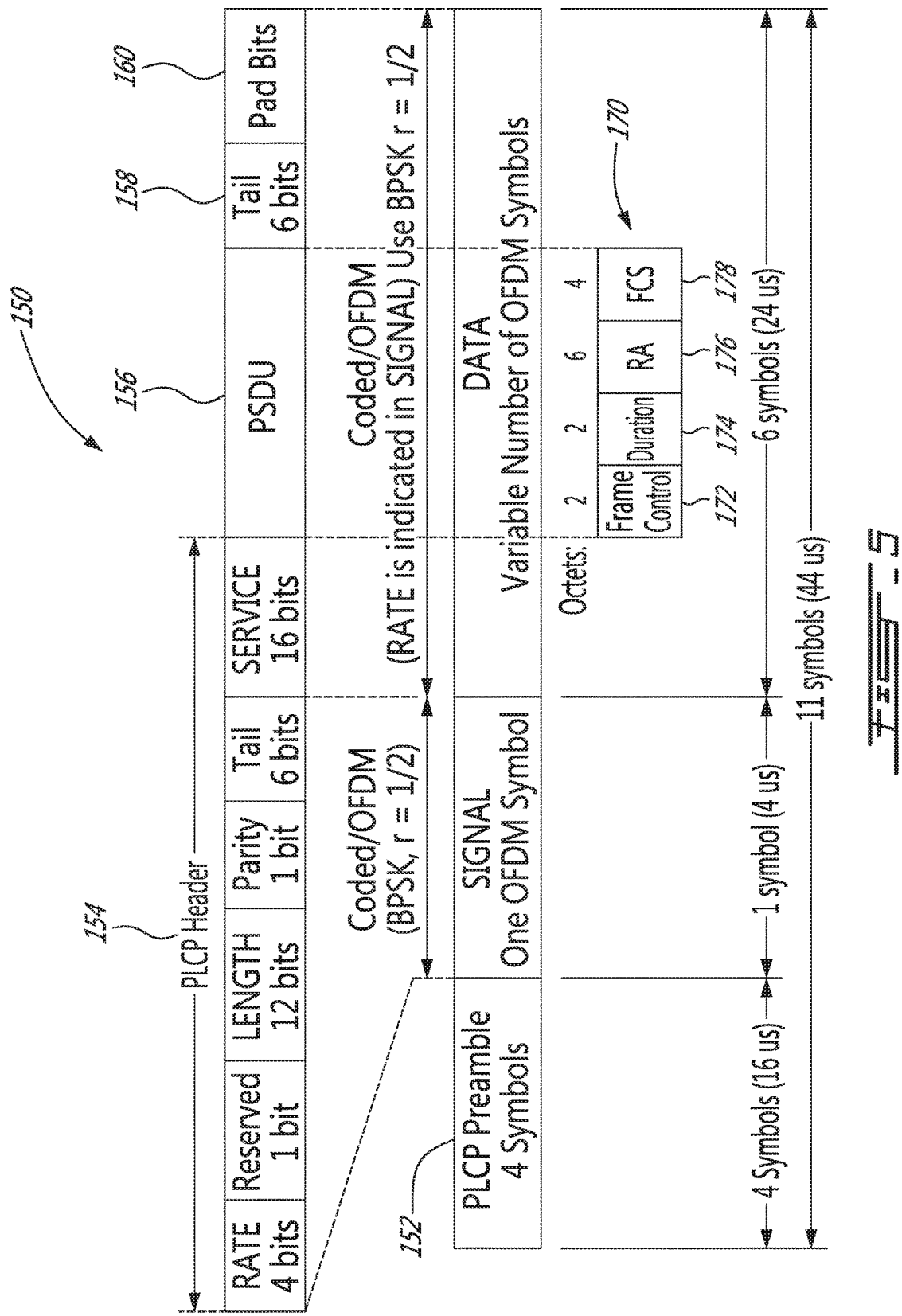
FIG. 5 illustrates a format example for the CTS-To-Self packet of FIG. 4A in accordance with the principles described herein.

FIG. 5 illustrates an example of a Physical Layer Convergence Protocol (PLCP) Protocol Data Unit (PPDU) 150 that includes the CTS-To-Self packet 124 shown in FIG. 4A in accordance with the principles described herein. In this example, the CTS-to-Self packet, denoted as 170, is included in a PLCP Service Data Unit field 156 of the PPDU 150 which also includes a preamble 152 and a header 154 (collectively herein referred to as header) as well as tail and pad fields 158, 160. The CTS frame 170 includes a frame control field 172 that specifies the type of frame 170 (in this case a CTS-To-Self frame), a duration field 174 to specify a NAV timer value, a Receiver Address (RA) field 176 which is set to the Transmitter Address for a CTS-To-Self packet and a Frame Check Sequence (FCS) field 178 which specifies an error-correcting code for the CTS packet 170. In some implementations, eleven Wi-Fi symbols, each 4 μs in duration, are required to transmit the CTS-To-Self packet 170 (as included in a PPDU 150) for a total transmission length of 44 μs which fits into a 71.4 or 80 μs LTE symbol.

Figure 6A:
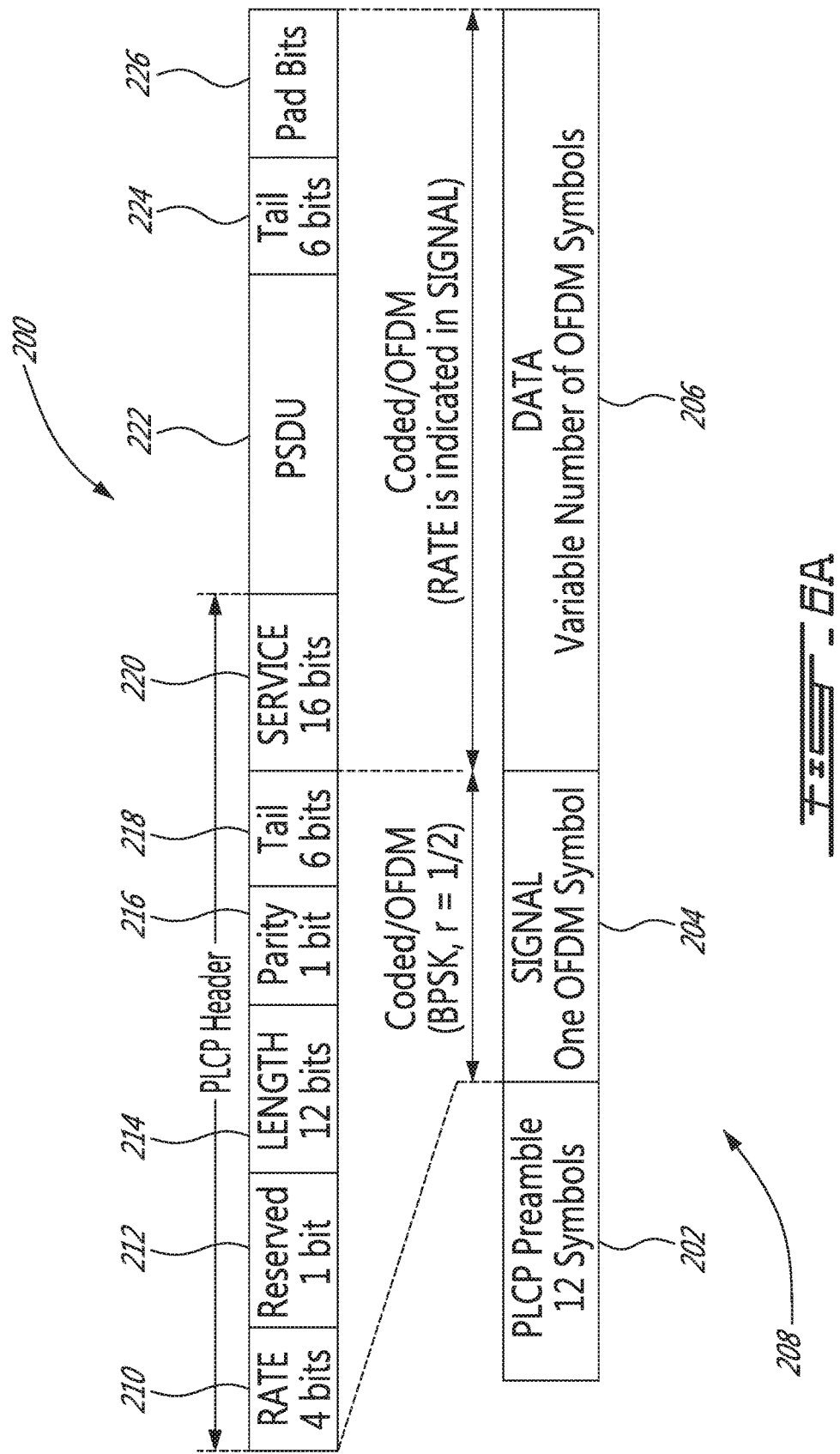
FIG. 6A-B illustrate format examples for the Wi-Fi header transmission shown in FIG. 4B in accordance with the principles described herein.

FIG. 6A illustrates an example of a format for the Wi-Fi header 134 shown in FIG. 4B in accordance with the principles described herein. In this example, the Wi-Fi header 134 is a PLCP header 208 which includes a preamble 202 and a Signal field (SIG) 204 (collectively herein referred to as header data) contains a channel reservation indication (in the SIG 204) to reserve the channel for a certain period of time. The channel reservation indication is set in a length field 214 as an octet count which is indicative of the amount of data to follow in a data field 206. Together with a modulation rate for the data specified in rate field 210, the channel reservation indication in the length field 214 is indicative of the time required to transmit or an end transmission time for the data (e.g. up to 5 msec). The data contained in the data field 206 and the PLCP header 208 are shown as a combined transmission 200 where the data field length corresponds to the channel reservation indication contained in the SIG 204. However the PLCP header 208 and the data field 206 may be sent as two separate transmissions (e.g. non-contiguous transmissions). In some implementations, the data includes LTE symbols (e.g. LTE TTIs 138a-d in FIG. 4B) but in other examples, the data may include additional or other information such as Wi-Fi symbols and/or a random transmission (e.g. noise 136). Other possibilities exist for the data in the data field 206. As noted above, the data in the data field 206 may also be followed by an additional transmission, such as an additional set of LTE TTIs or some other transmission (e.g. a Wi-Fi transmission).

In addition to the length field 214, the SIG 204 also includes the rate field 210 that specifies a modulation rate for the data in the data field 206, a reserved field 212, a parity field 216, a tail field 218 and a service field 220. In some implementations, the tail field 218 is set to a value indicative of a type of symbols or OFDM associated with the data in the data field 206 (e.g. in this case an LTE type). In other implementations, the tail field 218 is set of a first value when LTE symbols are present in the data field 206 and a different value when non-LTE symbols (e.g. Wi-Fi symbols) are included). Advantageously, in some implementations, setting the tail field 218 to a value indicative of the presence of LTE symbols in the data field 206 notifies listening devices (devices configured to receive and demodulate the PLCP header 208) that the data field 206 contains symbols of a different OFDM type (e.g. LTE symbols). In other implementations, this indication is an OFDM indication and may be included in another field (other than the tail field 218 or the SIG 204) at the same or different layer. For example, in yet other implementations, the OFDM indication is included in a MAC layer protocol field, such as the Frame Control Field which contains bits (e.g. b0 and b1) normally used to specify an associated protocol. This OFDM indication may represent an OFDM type or mode or an OFDM parameter associated with the data in the data field 206 such as symbol duration, CP duration, number of subcarriers, subcarrier spacing, subcarrier modulation formats, subcarrier frequencies, etc.

Figure 6B:
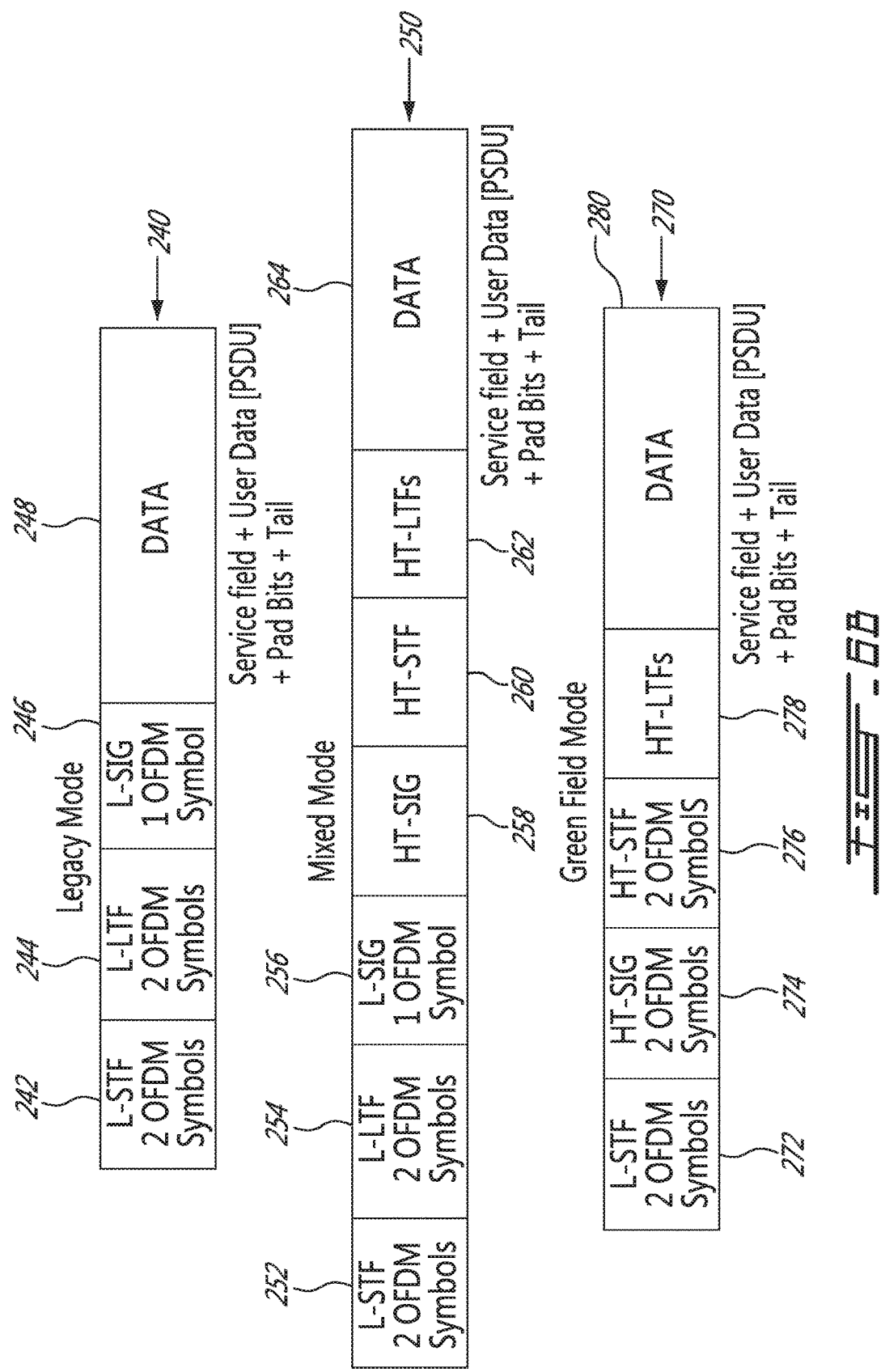

FIG. 6B shows other format examples for the Wi-Fi header 134 shown in FIG. 4B that can be used by the access node 60 to reserve a channel according to the principles described herein. For a legacy mode, transmission 240 includes a Legacy (L) Short Training Field (STF) 242, a Legacy (L) Long Training Field (LTF) field 244, and a Legacy (L)-SIG 246 that contains a channel reservation indication to reserve the channel for the data (e.g. LTE symbols or Wi-Fi symbols) to be transmitted in data field 248. For a mixed mode, transmission 250 includes an L-STF 252, an L-LTF 254, an L-SIG 256, a High Throughput (HT)-SIG field 258, an HT-STF 260, an HT-LTF 262 and a data field 264. Either the L-SIG 246 or the HT-SIG 258 is configured to contain a channel reservation indication to reserve the channel for the data to be transmitted in the data field 264. For a green field mode, transmission 270 includes an L-STF 272, an HT SIG 274, an HT-STF 276, an HT-LTF 278 and a data field 280. The HT-SIG 274 is configured to contain a channel reservation indication to reserve the channel for the data to be transmitted in the data field 280. In some implementations, the data in the data field 248, 264, 280 includes LTE symbols (e.g. LTE TTIs 138a-d in FIG. 4B) but in other examples, the data may include additional or other information such as Wi-Fi symbols and/or a random transmission (e.g. noise 136). Other possibilities exist for the data in the data field 248, 264, 280. As noted above, the data in the data field 248, 264, 280 may also be followed by an additional transmission, such as an additional set of LTE TTIs or some other transmission (e.g. a Wi-Fi transmission).

Although the examples provided above show that the channel reservation indication used is a length value included in a SIG field, other possibilities exist. Generally, any control data or field in the Wi-Fi header 134 can be used for the channel reservation indication. In other implementations, the channel reservation indication is a value indicative of any one of a transmission length, time or type or a channel reservation time associated with the Wi-Fi header 134, the data in the data field LTE symbols and/or both. Other possibilities exist for the channel reservation indication.

According to principles of the present disclosure, there are many different ways for an LTE transmitter (the access node 60) to generate Wi-Fi symbols containing Wi-Fi header or packet data. In one example, the LTE transmitter is configured to obtain a dynamically generated (i.e. generated when needed) or a pre-determined time-domain signal or vector of M samples (e.g. a Common Public Radio Interface (CPRI) I/Q vector) that spans over a portion or an entire LTE symbol duration. In another implementation, the LTE transmitter is configured to obtain a dynamically generated or a pre-determined frequency-domain vector of M LTE subcarrier modulation values for one LTE symbol. These M subcarrier modulation values may be QAM constellations, or subcarriers I/Q values. In some implementations, when the M subcarrier modulation vector is applied in the LTE transmitter to an M-point Inverse Fast Fourier Transform (IFFT), the resulting Wi-Fi transmission generated can be recovered at Wi-Fi receivers by an N-point FFT. The Wi-Fi transmission may also be recovered by other LTE receivers since the transmission would align with LTE subcarrier constellations.

There are many different configurations that can be used in an LTE transmitter to generate Wi-Fi subcarriers or symbol information. In one example, the LTE transmitter configuration may include two separate and independent physical layers (LTE and Wi-Fi), with different ASIC components and/or circuitry that reflect differences in for example, the symbol durations, cyclic prefix durations, number of subcarriers, subcarrier spacing, subcarrier modulation formats, subcarrier frequencies, or any one of numerous MAC layer differences, but it does not preclude that a common ASIC or other hardware circuitry can be configured to support both OFDM technologies. However, in other implementations, it is possible to integrate both OFDM technologies into the same device or set of components and configure these components to operate either in an LTE or Wi-Fi mode. The transmitter configuration examples provided below apply to equally to implementations with dedicated circuitry or common to all OFDM technologies supported (and operable in different modes).

Figure 7A:
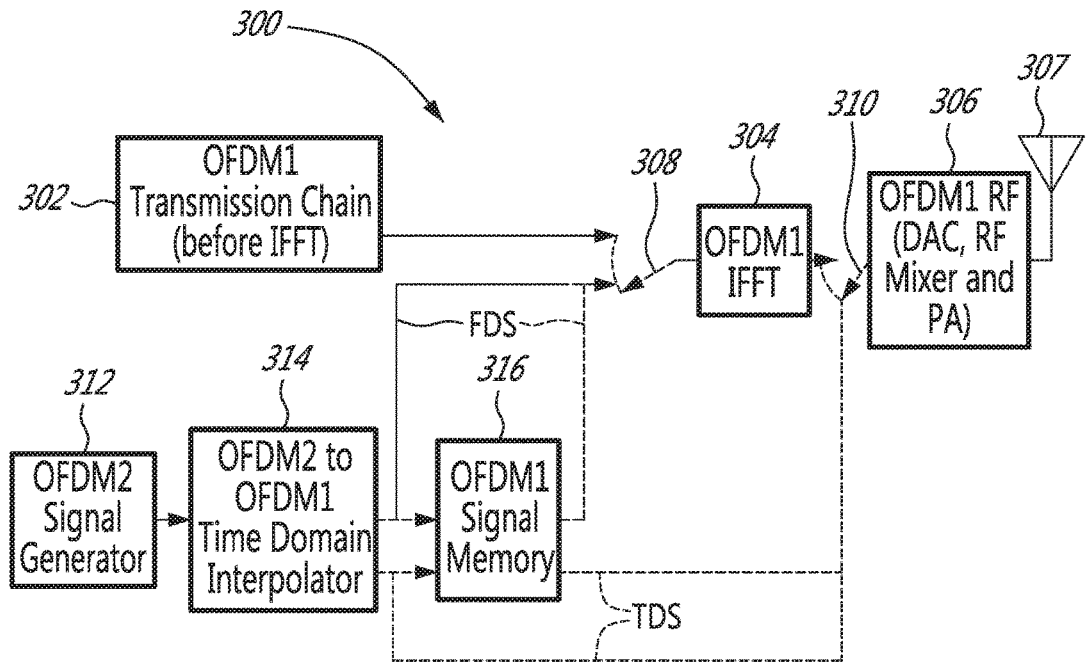
FIG. 7A-B illustrates block diagram examples of the LTE node in the LTE RAN of FIG. 1, in accordance with the principles described herein.
Figure 7B:
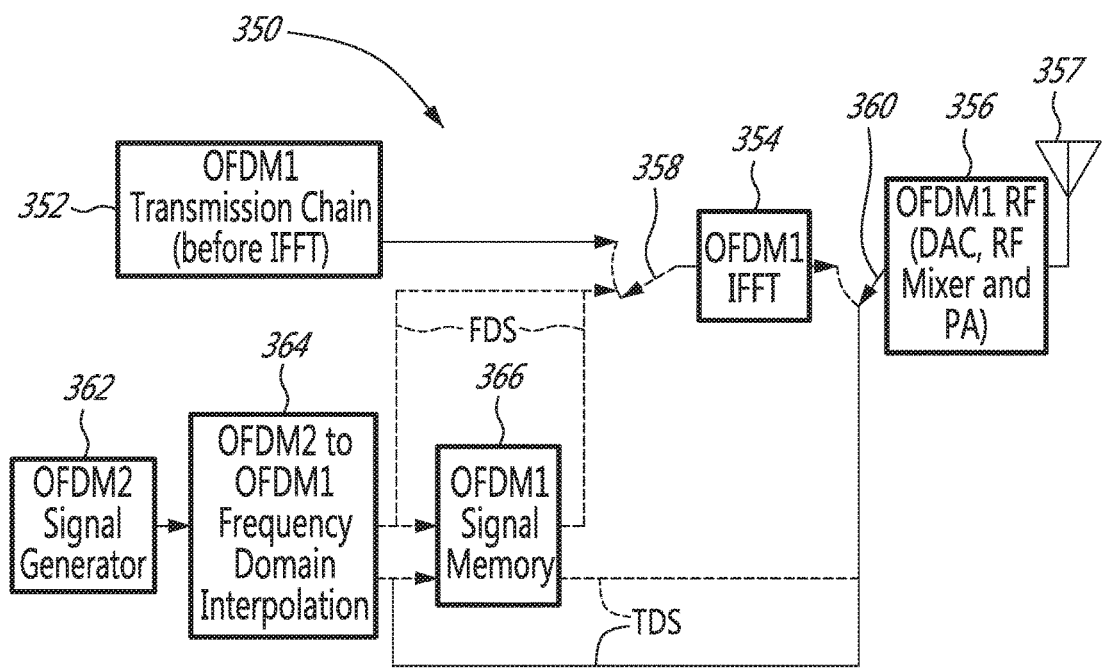

Turning now to FIGS. 7A and 7B, there is shown two different block diagram examples of a base OFDM transmitter 300, 350 of a (base) OFDM technology, denoted as OFDM1 (e.g. a 3GPP or LTE technology), which, in addition to being configured for OFDM1 transmissions, is also configured to transmit subcarrier or symbol information of another OFDM technology, denoted as OFDM2 (e.g. a Wi-Fi technology), such that it can be decoded by OFDM2 receivers (e.g. Wi-Fi receivers). The OFDM1 transmitters 300, 350 (e.g. the access node 60 in the LTE RAN 10 of FIG. 1) are each configured to provide and transmit a set of OFDM2 symbols (i.e. one or more) during one OFDM1 symbol duration. In some implementations, each of the OFDM2 symbols includes an OFDM2 Cyclic Prefix (CP) and has an OFDM2 symbol duration that is smaller than the OFDM1 symbol duration. In some implementations, after transmitting the OFDM2 symbol set, the OFDM1 transmitter 300, 350 is configured to transmit a set of OFDM1 symbols, using the base OFDM1 subcarriers. The OFDM2 and OFDM1 symbol set transmissions may be contiguous or non-contiguous. As mentioned above, the ODFM1 transmitter 300, 350 may use the OFDM2 symbol set to encode various types of OFDM2 related information for various purposes, including for example to reserve a channel for a certain duration, to indicate a transmission time associated with the OFDM2 and/or OFDM1 symbol set transmission or to create a carrier sense indication, for example, to cause OFDM2 receivers to consider the channel as busy. In some implementations, the OFDM2 symbol set includes Wi-Fi header data and/or Wi-Fi packet data and the OFDM1 symbol set includes LTE data (or LTE TTIs) and the Wi-Fi header or packet data in the OFDM2 symbol set is indicative of a transmission length, a transmission time, a transmission type and/or a channel reservation time associated with the Wi-Fi header/packet data, the LTE data or a combination of both.

The OFDM1 transmitter 300 has an OFDM1 transmission chain 302, an OFDM1 Inverse Fast Fourier Transform (IFFT) unit 304 and an OFDM1 RF unit 306 (e.g. DAC, mixer, and PA) which, in combination, are configured for OFDM1 transmissions via one or more antennas 307. In some implementations the OFDM1 transmission chain 302 converts a serial OFDM1 symbol stream of Binary Phase Shift Keying (BPSK) or Quadrature Amplitude Modulation (QAM) data into M parallel streams. The OFDM1 transmission chain output is modulated onto M base OFDM1 subcarriers via the OFDM1 IFFT unit 304 and then transmitted via the RF unit 306 and antennas 307.

According to principles of the present disclosure, the OFDM1 transmitter 300 also includes circuitry that is configured to produce an OFDM1 signal that carries OFDM2 information for transmission via the antennas 307. In one implementation, the circuitry includes an OFDM2 signal generator 312 configured to generate an OFDM2 signal. The OFDM2 signal is a time-domain signal that contains predetermined or defined OFDM2 symbol information generated with, for example, N OFDM2 subcarriers. In that implementation, the circuitry further includes an OFDM2-OFDM1 Time-Domain (TD) interpolator 314 that interpolates in the time-domain the OFDM2 signal generated (further details below) to produce a frequency-domain OFDM1 signal denoted as FDS that is fed into the OFDM1 IFFT and RF units 304, 306 via switch 308 for transmission via antenna 307.

However other possibilities exist. In another implementation, the circuitry includes an OFDM1 signal memory 316 where the FDS signal is stored. When the OFDM1 transmitter 300 determines that OFDM2 information needs to be transmitted, it generates the FDS dynamically (e.g. on the fly) using the signal generator 312 and TD interpolator 314 or simply reads the FDS signal from the signal memory 316 and routes it into the OFDM1 IFFT and RF units 304, 306 via switch 308. In implementations where the FDS signal is read from the signal memory 316, the circuitry may only include signal memory 316. In other implementations, the stored FDS signal is a predetermined or defined vector of OFDM1 (frequency-domain) subcarrier modulation values (e.g. a vector with M values) that includes values representative of predetermined or defined OFDM2 information.

In one example, the following vector of non-zero LTE subcarrier modulation values can be used by an LTE transmitter to produce an STF using a group of 2048 subcarriers (sequentially numbered from −1024 to 1024):

STF_LTE_SCs=[−499,−415,−332,−249,−165,−82,85, 168,252,335,418,502]

STF_LTE_SC_Value=√(13/6)*[1+$i$,−1−$i$,1+$i$,−1−$i$,−1−$i$,1+$i$,−1−$i$,−1−$i$,1+$i$,1+$i$,1+$i$]

Each of the twelve LTE subcarriers identified above in the STF_LTE_SCs array by sequence number is set to a corresponding non-zero modulation value in the STF_LTE_SC_Value array. All other LTE subcarriers in the group (those not identified in the STF_LTE_SCs array) are set to a zero value (e.g. (0+0$i$)).

In another example, for an LTE transmitter configured to use 2048 subcarriers, the following vector of LTE subcarrier modulation values can be used to produce an LTF:

LTF_LTE_SCs=[−540,−519,499,−478,−457,−436,−415,−394,−374,−353,−332,−311,−290,−269,−249,−228,−207,−186,−165,−144,−124,−103,−82,−61,−40,−19,22,43,64,85,106,127,147,168,189,210,231,252,272,293,314,335,356,377,397,418,439,460,481,502,522,543]

LTF_LTE_SC_Value=[1,1,−1,−1,1,1,−1,1,−1,1,1,1,1,1,1,−1,−1,1,1,−1,1,1,1,1,1,1,1,−1,−1,1,1,1,−1,1,−1,1,−1,−1,−1,−1,−1,−1,1,1,−1,−1,1,1,−1,−1,−1,1,1,1,1,1];

Each of the fifty-two LTE subcarriers identified above in the LTF_LTE_SCs array by sequence number is set to a corresponding non-zero modulation value in the LTF_LTE_SC_Value array while all other LTE subcarriers in the group (those not identified in the LTF_LTE_SCs array) are set to a zero value (e.g. (0+0$i$). Other possibilities exist for the LTE subcarrier modulation values.

In yet another implementation, the TD interpolator 314 instead uses a time-domain OFDM1 signal TDS to carry the OFDM2 information. In that implementation, when the OFDM1 transmitter 300 determines that the OFDM2 information needs to be transmitted, the OFDM1 transmitter 300 routes the TDS signal into the OFDM1 RF unit 306 via switch 310 directly from the TD interpolator 314 or via the signal memory 316. In implementations where the TDS signal is read from the signal memory 366, the circuitry may only include signal memory 366. In other implementations, the stored TDS signal is a predetermined or defined vector of OFDM1 (time-domain) samples (e.g. a vector with M samples) that is representative of predetermined or defined OFDM2 information.

In some implementations, the switch 308 (or 310 depending on whether the TD interpolator 314 produces a TDS or FDS signal) is part of a switching module that is configured to determine when OFDM2 information needs to be transmitted and based on that determination, to route the FDS (or TDS) signal containing the OFDM2 information to the OFMD1 IFFT 304 (or OFDM1 RF 306) for transmission as a set of OFDM2 symbols or route the OFDM1 transmission chain output for transmission as a set of OFDM1 symbols.

In other implementations, the switching module (or switch 308, 310) controls whether OFDM2 or OFDM1 information is transmitted via the OFDM1 IFFT 304 and/or RF 306. For example, when the switching module determines that OFDM2 information needs to be transmitted (e.g. when a Wi-Fi preamble or CTS packet needs to be sent to reserve the channel for a subsequent LTE transmission), the switching module routes the FDS signal (or TDS signal) containing the OFDM2 information to the OFDM1 IFFT 304 (or OFDM1 RF 306) for transmission as a set of OFDM2 symbols. Conversely, when the switching module determines that OFDM1 information needs to be transmitted (e.g. the subsequent LTE transmission), the switching module instead routes the output of the OFDM1 transmission chain 302 containing the OFDM1 information to the OFDM1 IFFT 304 for transmission via the OFDM1 RF 306 as a set of OFDM1 symbols.

In some implementations, prior to determining that OFDM2 information needs to be transmitted, a channel availability check is performed first (e.g. by a receiver in communication with the OFDM1 transmitter 300) to determine whether the transmission channel or band used is free. This check may be based on whether a carrier wave, signal or energy can be detected in the channel or band of interest (e.g. with a −62 dBm threshold). If no carrier or energy is detected, the switching module routes the switching module routes the FDS signal (or TDS signal) containing the OFDM2 information to the OFDM1 IFFT 304 (or OFDM1 RF 306) for transmission as a set of OFDM2 symbols. In some implementations, the switching module may rely on a channel availability indication provided by a channel availability unit (not shown) before it can determine that OFDM2 information can be transmitted.

In some implementations, it may be desirable for the OFDM1 transmitter 300 to occupy the channel as soon as possible after the channel availability check to ensure that other receivers do not consider the channel as free before the OFDM1 transmitter had a chance to begin its own OFDM2 transmission. In implementations where a delay is inevitable (for example when the OFDM2 information needs to be generated, interpolated, stored and/or converted into the time domain via the OFDM1 IFFT 304), the OFDM1 transceiver 300 may be configured to transmit a time domain signal that can be fed directly into the OFDM1 RF unit 306 until the desired OFDM2 information becomes available for transmission. For example, if the desired OFDM2 information is in the form of a frequency domain signal (FDS) that needs to go through the OFDM1 IFFT 304 (e.g. after having being generated in the OFDM2 signal generator 312 and processed in the interpolator 314 and/or the signal memory 316), the switching module may be configured, when it receives a positive channel availability indication, to route a repeatable time domain signal directly into the RF unit 306 until the desired OFDM2 information is ready for transmission. In some implementations, the repeatable time domain signal is another OFDM2 signal which has a repetitive or cyclical pattern. In one example, the repeatable OFDM2 signal is a sequence of LTFs and/or STFs. Other possibilities exist for the repeatable time domain signal used prior to transmitting the desired OFDM2 information.

FIG. 8 shows a block diagram example of a configuration for the OFDM2 signal generator 312 and OFDM2-OFDM1 TD interpolator 314 of FIG. 7A to generate and interpolate a Wi-Fi signal into an LTE signal in the time domain, in accordance to principles described herein. In this example, a Wi-Fi signal generator 402 includes a 64 point Wi-Fi IFFT unit 406 that is configured to perform an IFFT for each symbol time duration of a frequency-domain Wi-Fi signal 404 carrying pre-determined or defined Wi-Fi information (e.g. a Wi-Fi header or packet). The Wi-Fi signal generator 402 also includes a CP unit 408 that is configured to add a CP to each Wi-Fi symbol generated to create a set of Wi-Fi symbols carrying the pre-determined Wi-Fi information.

The Wi-Fi symbol set is fed into a LTE time-domain interpolator 412 that includes a re-sampling unit 414 configured to resample (e.g. by time-domain interpolation or low pass filtering) the Wi-Fi symbol set to produce a time-domain LTE signal 420 (e.g. C-PRI I/Q data). The LTE time-domain interpolator 412 may, in some implementations, include a padding unit 416 to pad the LTE signal 420 to turn it into an LTE I/Q vector (e.g. the TDS signal of FIG. 7A) that can be processed by conventional LTE RF circuitry (e.g. the OFDM1 RF unit 306 of FIG. 7A). In other implementations, the LTE time-domain interpolator 412 may further include an LTE FFT unit 418 to obtain a corresponding LTE signal 422 in the frequency-domain (e.g. the FDS signal of FIG. 7A) that can be processed by conventional LTE IFFT circuitry (e.g. the OFDM1 IFFT unit 304 of FIG. 7A). In yet other implementations, the LTE FFT unit 418 has an input size equal to the total size of the Wi-Fi symbols in the Wi-Fi symbol set and an output equal to the number of LTE subcarriers (e.g. 2048). Alternatively, the LTE FFT unit 418 used is the same as that used in a conventional LTE receiving chain. Other implementations are possible.

Returning to FIG. 7B, there is shown a different OFDM1 transmitter configuration which can be used if frequency-domain interpolation is preferred. Similarly to the OFDM1 transmitter 300, OFDM1 transmitter 350 also has an OFDM1 transmission chain 352, an OFDM1 IFFT unit 354, a switch 358 (or 360), an OFDM1 RF unit 356, antenna(s) 357, and circuitry including an OFDM2 signal generator 362, OFDM2-OFDM1 interpolator 364 and/or an OFDM1 signal memory 366. In contrast however, the OFDM2-OFDM1 interpolator 364 interpolates in the frequency domain the OFDM2 signal generated (further details below) to produce either a frequency-domain OFDM1 signal FDS carrying the OFDM2 information that can be transmitted by the OFDM1 RF unit 356 via switch 358 and OFDM1 IFFT unit 354 or a time-domain OFDM1 signal TDS that can be transmitted directly by the OFDM1 RF unit 356 via switch 360.

In some implementations, the switch 358 (or 360 depending on whether the FD interpolator 364 produces an FDS or TDS signal) is part of a switching module that is configured to determine when OFDM2 information needs to be transmitted and, based on that determination, to route the FDS (or TDS) signal containing the OFDM2 information to the OFMD1 IFFT 354 (or OFDM1 RF 367) for transmission as a set of OFDM2 symbols or route the OFDM1 transmission chain 352 output for transmission as a set of OFDM1 symbols. Similarly to the example shown in FIG. 7A, the FDS (or TDS) signal transmitted may be read from the OFDM1 signal memory 366 as the stored output of the FD interpolator 364 or as a predetermined vector of OFDM1 frequency domain (or time domain) subcarrier modulation values (or samples) representative of the OFDM2 information.

Similarly to the OFDM1 transmitter 300, the switching module in the OFDM1 transmitter 350 controls whether OFDM2 or OFDM1 information is transmitted via the OFDM1 IFFT 354 and/or RF 356. For example, when the switching module determines that OFDM2 information needs to be transmitted (e.g. when a Wi-Fi preamble or CTS packet needs to be sent to reserve the channel for a subsequent LTE transmission), the switching module routes the FDS signal (or TDS signal) containing the OFDM2 information to the OFDM1 IFFT 354 (or OFDM1 RF 356) for transmission as a set of OFDM2 symbols. Conversely, when the switching module determines that OFDM1 information needs to be transmitted (e.g. the subsequent LTE transmission), the switching module instead routes the output of the OFDM1 transmission chain 352 containing the OFDM1 information to the OFDM1 IFFT 354 for transmission via the OFDM1 RF 356 as a set of OFDM1 symbols.

In some implementations, prior to determining that OFDM2 information needs to be transmitted, a channel availability check is performed first (e.g. by a receiver in communication with the OFDM1 transmitter 350) based on whether a carrier wave, signal or energy can be detected in the channel or band of interest (e.g. with a −62 dBm threshold). If no carrier or energy is detected, the switching module routes the switching module routes the FDS signal (or TDS signal) containing the OFDM2 information to the OFDM1 IFFT 354 (or OFDM1 RF 356) for transmission as a set of OFDM2 symbols. In some implementations, the switching module may rely on a channel availability indication provided by a channel availability unit (not shown) before it can determine that OFDM2 information can be transmitted.

In some implementations, it may be desirable for the OFDM1 transmitter 350 to occupy the channel as soon as possible after the channel availability check to ensure that other receivers do not consider the channel as free before the OFDM1 transmitter had a chance to begin its own OFDM2 transmission. In some implementations, the OFDM1 transceiver 350 may be configured to transmit a time domain signal that can be fed directly into the OFDM1 RF unit 356 until the desired OFDM2 information becomes available for transmission. For example, if the desired OFDM2 information is in the form of a frequency domain signal (FDS) that needs to go through the OFDM1 IFFT 354 (e.g. after having being generated in the OFDM2 signal generator 362 and processed in the interpolator 364 and/or the signal memory 366), the switching module may be configured (when it receives a positive channel availability indication) to route a repeatable time domain signal (e.g. a sequence of LTFs and/or STFs) to the OFDM1 RF unit 56 so that it can be transmitted until the desired OFDM2 information is ready for transmission. Other possibilities exist for the repeatable time domain signal used prior to transmitting the desired OFDM2 information.

FIG. 9 shows a block diagram example of a configuration for the OFDM2 OFDM2-OFDM1 FD interpolator 364 of FIG. 7B configured to interpolate, in the frequency domain, a Wi-Fi signal 456 carrying pre-determined or defined Wi-Fi information (e.g. a Wi-Fi header or packet) into an LTE signal 470, 472. In this example, a Frequency Domain (FD) interpolation unit 452 includes a symbol interpolator 458 that interpolates on a Wi-Fi symbol-by-symbol basis i.e. one Wi-Fi symbol at a time. In one implementation, the symbol interpolator 458 interpolates the N (e.g. 64) Wi-Fi subcarriers into M (e.g. 2048) LTE subcarriers using the following "sinc" function:

$$\text{LTE\_Subcarrier}(m) = \sum_{n=-32}^{32} Wi-\text{Fi\_subcarrier}(n) \times \text{sinc}\left(\left[m - \left(\frac{312.5}{15}\right)n\right]\right)$$

$$m = -1024, \ldots, 1024$$

where:

$$\text{sinc}(x) = \frac{\sin \pi x}{\pi x}$$

However, this is only one function example for the symbol interpolator 458. Other frequency interpolation functions may be used to map N Wi-Fi subcarriers into M LTE subcarriers.

The symbol interpolator 458 takes as input the Wi-Fi signal 456 in the frequency domain that corresponds to one Wi-Fi symbol time duration. The output is fed into an LTE IFFT unit 460 which produces a set of M time-domain samples (e.g. 2048) which span over one LTE symbol duration. In some implementations, the time-domain set of M samples is truncated in truncation unit 464 (e.g. by selecting a subset of samples (e.g. 98) to correspond to one Wi-Fi symbol duration (e.g. 3.2 μs) thereby producing LTE I/Q data corresponding to the one Wi-Fi symbol duration processed by the symbol interpolator 458. The FD interpolation unit 452 also includes a concatenation unit 464 that concatenates the LTE I/Q data produced with any LTE I/Q data that might have been produced for Wi-Fi symbols previously processed by the interpolator 452. The Wi-Fi symbols are thus processed in the FD interpolation unit 452 until all of the Wi-Fi symbols in the Wi-Fi signal have been processed. The concatenation unit 464 produces a time-domain LTE signal or I/Q vector 470 (e.g. the TDS signal of FIG. 7B) formed of the concatenated LTE I/Q data corresponding to the entire Wi-Fi signal) so that it can then be processed by conventional LTE RF circuitry (e.g. the OFDM1 RF unit 356 of FIG. 7B). The FD interpolating unit 452 may, in some implementations, include an LTE FFT unit 468 to obtain a corresponding LTE signal 472 in the frequency-domain (e.g. the FDS signal of FIG. 7B) that can be processed by conventional LTE IFFT circuitry (e.g. the OFDM1 IFFT unit 354 of FIG. 7B). Alternatively, the LTE FFT unit 468 is the same as that used in a conventional LTE receiving chain. Other implementations are possible.

Figure 10A:
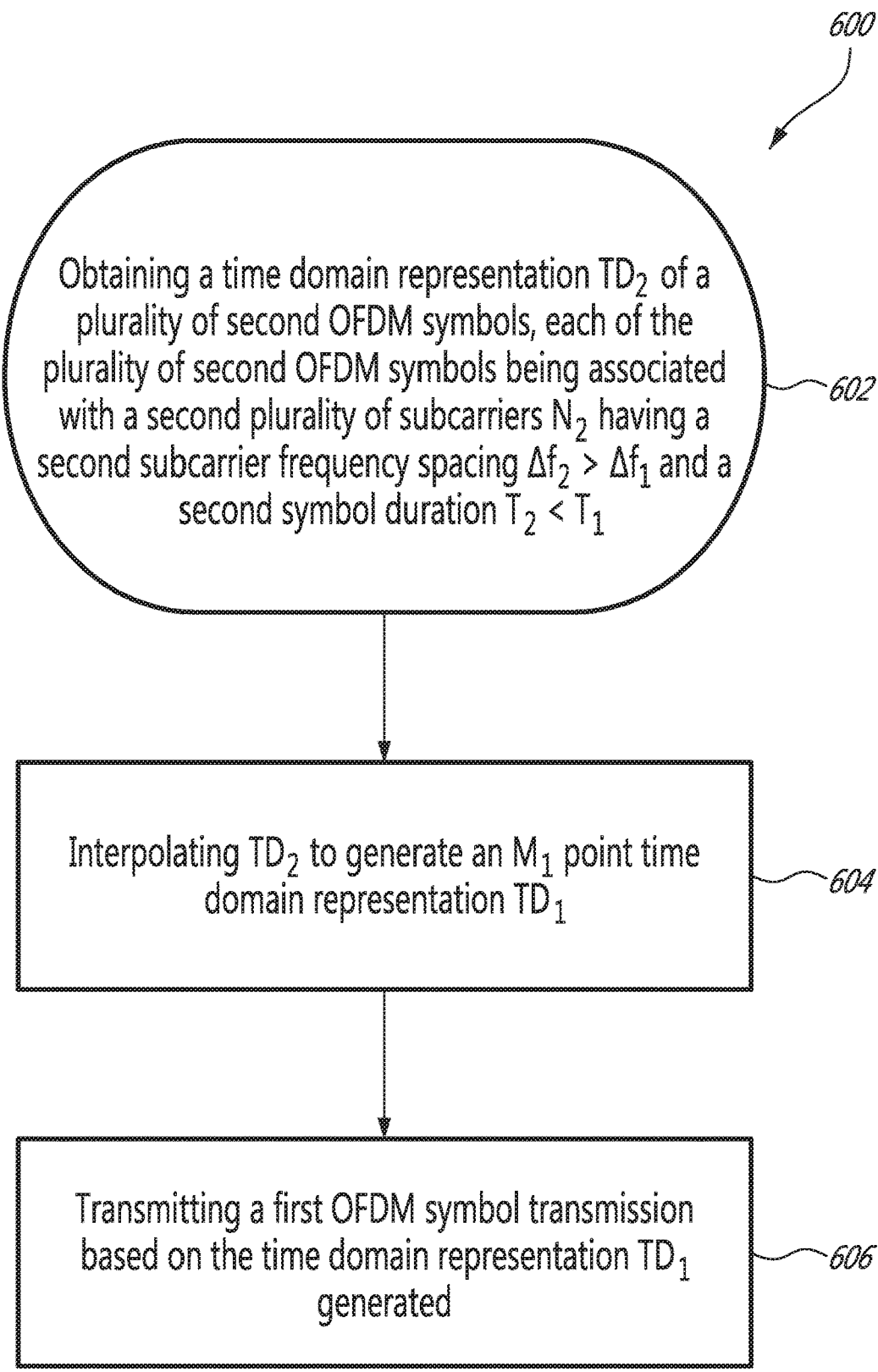
FIGS. 10A-10B show a flow chart of example methods for the OFDM transmitters of FIGS. 7A-B in accordance with the principles described herein.

FIG. 10A shows an example method 600 for the OFDM transmitter 300 of FIG. 7A. In this method, the OFDM transmitter 300 is assumed to be configured for first OFDM symbol transmissions using a base plurality of subcarriers $M_1$ having a base subcarrier frequency spacing $\Delta f_1$ defining a base symbol duration $T_1$. At step 602, the method 600 includes obtaining a time domain representation $TD_2$ of a plurality of second OFDM symbols, each of the plurality of second OFDM symbols being associated with a second plurality of subcarriers $N_2$ having a second subcarrier frequency spacing $\Delta f_2 < \Delta f_1$ and a second symbol duration $T_2 > T_1$. At step 604, the method includes interpolating $TD_2$ to generate an $M_1$ point time domain representation $TD_1$, and at step 606, the method includes transmitting a first OFDM symbol transmission based on the time domain representation $TD_1$ generated.

In some implementations, the method 600 includes, performing an $M_1$ point Fast Fourier Transform (FFT) of $TD_1$ to generate a frequency domain representation $FD_1$ of $TD_1$, and performing an $M_1$ point Inverse FFT (IFFT) to generate the first OFDM symbol transmission. In other implementations, each of the plurality of second OFDM symbols is represented in $TD_2$ by $N_2$ points where $N_2$ is smaller than $M_1$. In other implementations, the interpolating of $TD_2$ includes resampling $TD_2$ to obtain $M_1$ points for the time domain representation $TD_1$. In yet other implementations, the obtaining includes generating $TD_2$ using an $N_2$ point Inverse FFT (IFFT). In other implementations, the obtaining includes reading $TD_2$ from a memory.

In some implementations, $M_1$ is a number of LTE subcarriers and $N_2$ is a number of Wi-Fi subcarriers. In other implementations, $M_1$=2048, $\Delta f_1$=15 KHz, $T_1$=66.7 us, $N_2$=64, $\Delta f_2$=312.5 KHz and $T_2$=3.2 us. Other implementations are possible.

Figure 10B:
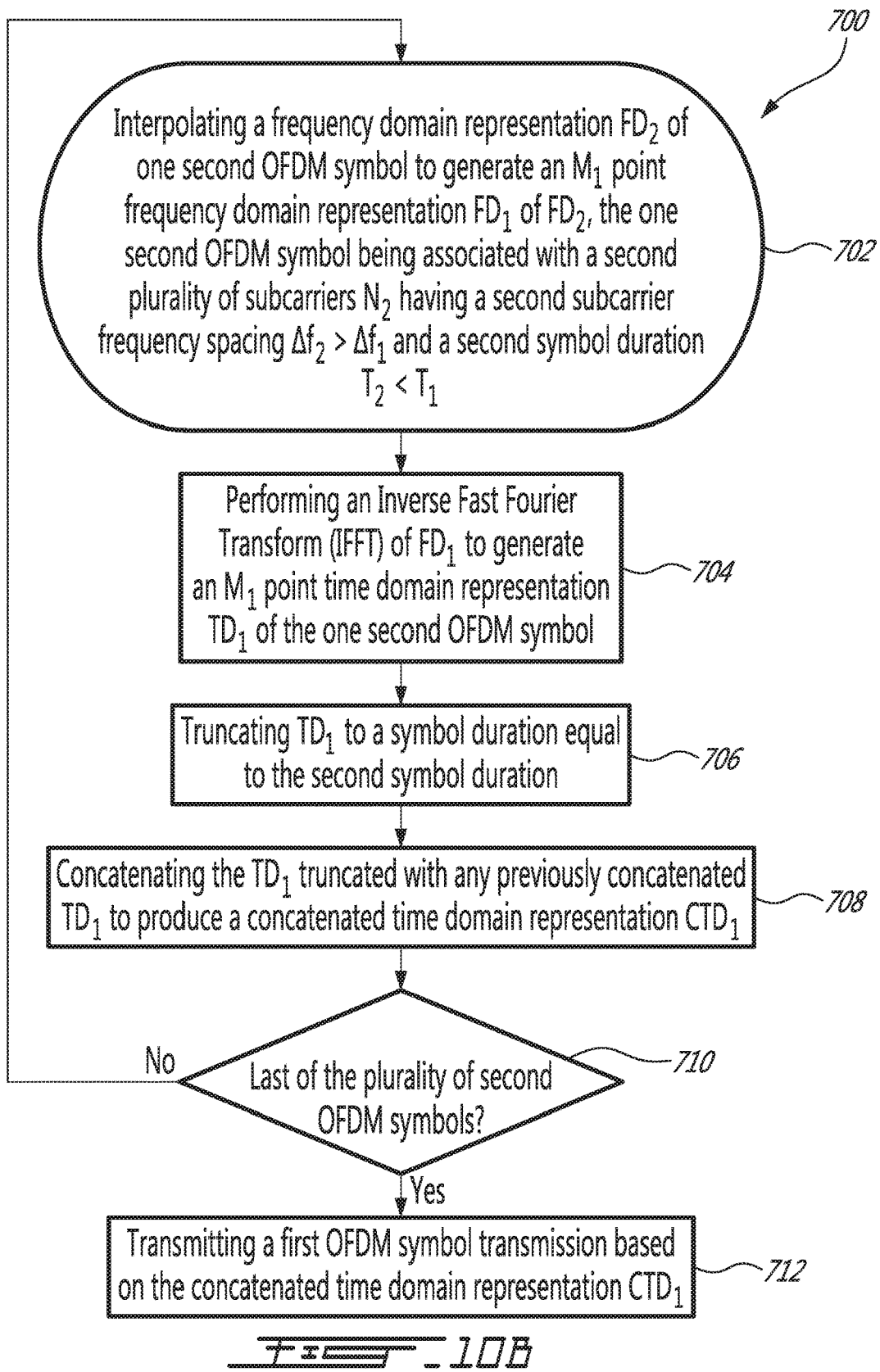

FIG. 10B shows an example method 700 for the OFDM transmitter 350 of FIG. 7B. In this method, the OFDM transmitter 350 is assumed to be configured for first OFDM symbol transmissions using a base plurality of subcarriers $M_1$ having a base subcarrier frequency spacing $\Delta f_1$ defining a base symbol duration $T_1$. The method 700 includes a set of steps 702, 704, 706, 708 which are performed for each one of a plurality of second OFDM symbols associated with a second plurality of subcarriers $N_2$ having a second subcarrier frequency spacing $\Delta f_2 > f_1$ and a second symbol duration $T_2 < T_1$. First, the method 700 includes interpolating at step 702 a frequency domain representation $FD_2$ of the one second OFDM symbol to generate an $M_1$ point frequency domain representation $FD_1$ of $FD_2$. At step 704, the method 700 then includes performing an Inverse Fast Fourier Transform (IFFT) of $FD_1$ to generate an $M_1$ point time domain representation $TD_1$ of the one second OFDM symbol, and truncating $TD_1$ at step 706 to a symbol duration equal to the second symbol duration. The method 700 further includes at step 708 concatenating the $TD_1$ truncated with any previously concatenated $TD_1$ to produce a concatenated time domain representation $CTD_1$. If at step 710, steps 702-708 were performed for the last of the plurality of second OFDM symbols, the method 700 goes to step 712 where it includes transmitting a first OFDM symbol transmission based on the concatenated time domain representation $CTD_1$. Otherwise, the method 700 goes back and performs steps 702-708 for the next second OFDM symbol until all of the second OFDM symbols have been processed.

In some implementations, the method further includes performing an $M_1$ point Fast Fourier Transform (FFT) of the $CTD_1$ to generate a frequency domain representation $FD_1$ of $CTD_1$ and performing an $M_1$ point IFFT to generate the first OFDM symbol transmission representative of the plurality of second OFDM symbols.

In some implementations, the interpolating of $FD_2$ is performed in accordance with the following function:

$$\text{Base\_Subcarrier}(m) = \sum_{n=-32}^{32} \text{Second\_Subcarrier}(n) \times \text{sinc}\left(\left|m - \left(\frac{312.5}{15}\right)n\right|\right)$$

$$m = -1024, \ldots, 1024$$

where:

$$\text{sinc}(x) = \frac{\sin \pi x}{\pi x}$$

In some implementations, $M_1$ is a number of LTE subcarriers and $N_2$ is a number of Wi-Fi subcarriers. In other implementations, $M_1$=2048, $\Delta f_1$=15 KHz, $T_1$=66.7 μs, $N_2$=64, $\Delta f_2$=312.5 KHz and/or $T_2$=3.2 us. Other implementations are possible.

Simulation tests have shown that OFDM2 symbols (e.g. Wi-Fi symbols) generated based on the principles described above can be received and demodulated by an OFDM2 receiver (e.g. Wi-Fi) despite the fact that they have been generated by an OFDM1 transmitter (e.g. LTE) with OFDM1 subcarriers. In some implementations, an OFDM2 receiver is configured to receive, using N OFDM2 subcarriers, a set of OFDM2 symbols generated with M OFDM1 subcarriers. In other implementations, the OFDM2 receiver includes an N-point FFT to receive the OFDM2 symbol set which was generated with an M-point IFFT in the OFDM1 transmitter. Other possibilities exist for the OFDM2 receiver. In yet other implementations, the OFDM2 symbol set includes OFDM2 control or packet data which is indicative of one of a transmission length, transmission time, transmission type and a channel reservation time associated with the OFDM2 symbol set, an OFDM1 symbol set transmitted after the OFDM2 symbol set or a combination thereof. Other possibilities exist for the OFDM2 receiver.

Figure 11:
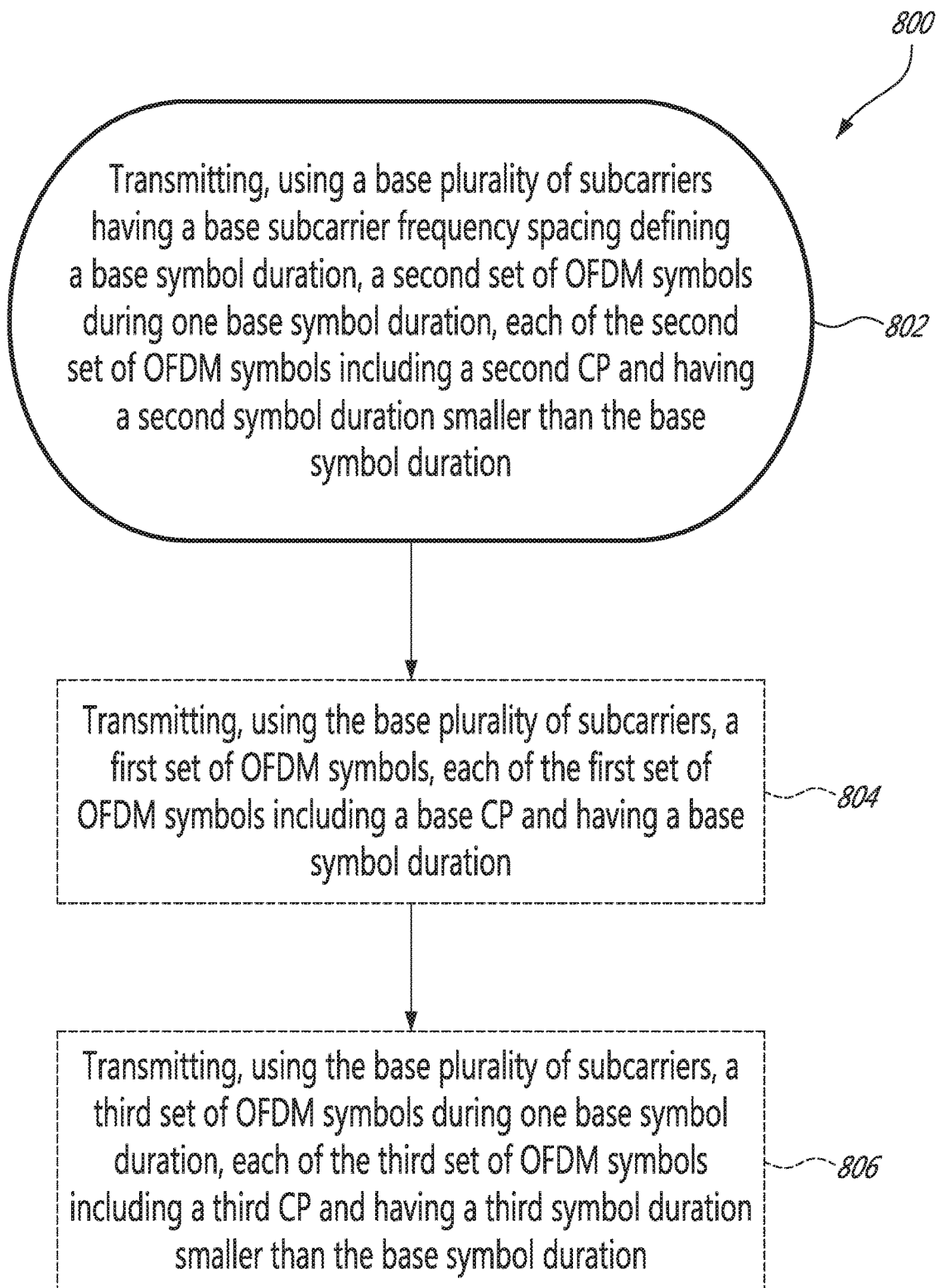
FIG. 11 shows a flow chart of another example method for the OFDM transmitters of FIGS. 7A-B in accordance with the principles described herein.

FIG. 11 shows a flow chart of another example method 800 for the OFDM transmitters 300, 350 of FIGS. 7A-B in accordance with the principles described herein. In this method, the OFDM transmitters 300, 350 are assumed to be configured for transmission of a first set of OFDM symbols using a base plurality of subcarriers having a base subcarrier frequency spacing defining a base symbol duration. At step 802, the method 800 includes transmitting, using the base plurality of subcarriers, a second set of OFDM symbols during one base symbol duration, each of the second set of OFDM symbols including a second CP and having a second symbol duration smaller than the base symbol duration. Optionally at step 804, the method 800 may also include transmitting, using the base plurality of subcarriers, a first set of OFDM symbols, each of the first set of OFDM symbols including a base CP and having a base symbol duration. The method may also include optionally at step 806 transmitting, using the base plurality of subcarriers, a third set of OFDM symbols during one base symbol duration, each of the third set of OFDM symbols including a third CP and having a third symbol duration smaller than the base symbol duration.

FIGS. 12A-B are block diagrams of exemplary embodiments of respectively a (base) OFDM1 transmitting node 1000 (e.g. an LTE transmitter) and an OFDM2 receiving node (e.g. a Wi-Fi receiver) configured to transmit or receive OFDM2 symbols generated using base OFDM1 subcarriers in accordance with the principles of the present disclosure.

As illustrated in FIG. 12A, OFDM1 transmitting node 1000 includes a transceiver 1002, one or more processor(s) 1004, memory 1006 which includes one or more of a generation module 1008, an interpolation module 1010, a signal memory module 1012 a switching module 1014 and a transmitting module 1016. In one embodiment, the transceiver 1002 may be replaced by a transmitter and a receiver (not shown). The generation module 1008 is configured to perform the signal generation functionality described above which includes generating a (time-domain or frequency domain) OFDM2 signal that contains pre-determined or defined OFDM2 information. The interpolation module 1010 is configured to perform the interpolation functionality described above, which includes interpolating the OFDM2 signal to produce a (time-domain or frequency domain) OFDM1 signal representative of predetermined or defined OFDM2 information. The signal memory module 1012 is configured to perform the storing functionality described above which includes storing the OFDM1 signal generated or a predetermined OFDM1 signal that contains the OFDM2 information. The switching module 1014 is configured to perform the switching functionality described above, which includes routing the OFDM1 signal containing the OFDM2 information for transmission as a set of OFDM2 symbols or routing the output of an OFDM1 transmission chain for transmission as a set of OFDM1 symbols. The transmitting module 1016 is configured to perform the transmitting functions described above which includes transmitting using an OFDM1 plurality of subcarriers, a set of OFDM2 symbols during one OFDM1 symbol duration and transmitting using the OFDM1 plurality of subcarriers, a set of OFDM1 symbols, each of an OFDM1 symbol duration.

Depending on the implementation (e.g whether the OFDM2 information is generated on the fly or retrieved from memory when needed), not all of the generation, interpolation, storing and/or switching functions need to be performed as noted above and as such, some of these modules may be optional. For example, in one implementation, the OFDM2 information is stored in the signal memory module 1012 in advance, and the memory 1006 only includes the signal memory module 1012, the switching module 1014 and the transmitting module 1016 respectively performing the functions described above. The generation module 1008, interpolation module 1010, signal memory module 1012, switching module and transmitting module 1016 are implemented at least partially in the memory 1006 in the form of software or (computer-implemented) instructions executed by the processor(s) 1004 within the OFDM1 transmitting node 1000 or distributed across two or more nodes (e.g., the OFDM1 transmitting node 1000 and another node). In another example, the processor(s) 1004 includes one or more hardware components (e.g., Application Specific Integrated Circuits (ASICs)) that provide some or all of the generation, interpolation, storing, switching and transmitting functionality described above. In another embodiment, the processor(s) 1004 include one or more hardware components (e.g., Central Processing Units (CPUs)), and some or all of the generation, interpolation, storing, switching and transmitting functionality described above is implemented in software stored in, e.g., the memory 1006 and executed by the processor 1004. In yet another embodiment, the processor(s) 1004 and memory 1006 form processing means (not shown) configured to perform the generation, interpolation, storing, switching and transmitting functionality described above.

As illustrated in FIG. 12B, OFDM2 receiving node 1100 includes a transceiver 1102, one or more processor(s) 1104, and memory 1106 which includes a receiving module 1108, and a transmission control module 1110. In one embodiment, the transceiver 1102 may be replaced by a transmitter and a receiver (not shown). The receiving module 1108 is configured to perform the receiving functionality described above which, as noted above includes receiving a set of OFDM2 symbols transmitted from an OFDM1 transmitting unit, using OFDM1 subcarriers. The transmission control module 1110 is configured to perform the transmission control functionality described above, which includes determining if the OFDM2 symbols contain data indicative of one of a transmission length, a transmission time, a transmission type, and/or a channel reservation time associated with at least one of the OFDM2 symbol set and a set of OFDM1 symbols to be transmitted by the OFDM1 transmitting unit and if so, refraining from transmitting based on the data received.

The receiving module 1108 and transmission control module 1110 are implemented at least partially in the memory 1106 in the form of software or (computer-implemented) instructions executed by the processor(s) 1104 within the OFDM2 receiving node 1100 or distributed across two or more nodes (e.g., the OFDM2 receiving node 1100 and another node or device). In another example, the processor(s) 1104 includes one or more hardware components (e.g., Application Specific Integrated Circuits (ASICs)) that provide some or all of the receiving and transmission control functionality described above. In another embodiment, the processor(s) 1104 include one or more hardware components (e.g., Central Processing Units (CPUs)), and some or all of the receiving and transmission control functionality described above is implemented in software stored in, e.g., the memory 1106 and executed by the processor 1104. In yet another embodiment, the processor(s) 1104 and memory 1106 form processing means (not shown) configured to perform the receiving and transmissions control functionality described above.

FIGS. 13A-B show a variant for each of the OFDM transmitting and receiving node examples of FIGS. 12A-B, denoted respectively as OFDM transmitting node 1200, and ODFM receiving node 1300. Each of the nodes, 1200, 1300 includes a transceiver 1202, 1302 and circuitry containing (computer-implemented) instructions which when executed by one or more processor(s) 11204, 1304 cause their respective node 1200, 1300 to perform some or all of the generation, interpolation, storing, switching, transmitting, receiving and transmission control functionality described above. In yet another variant, the circuitry includes the respective memory 1206, 1306 and processor(s) 1204, 1304 which, similarly to the example nodes 1000 and 1100 of FIGS. 12A-B may be implemented in many different ways. In one example, the memories 1206, 1306 contain instructions which, when executed, cause the respective node 1200, 1300 to perform some or all of their generation, interpolation, storing, switching, transmitting, receiving and transmission control functionality described above. Other implementations are possible.

It will be appreciated by persons skilled in the art that the present invention is not limited to what has been particularly shown and described herein above. In addition, unless mention was made above to the contrary, it should be noted that all of the accompanying drawings are not to scale. A variety of modifications and variations are possible in light of the above teachings without departing from the scope of the present disclosure.

The invention claimed is:

1. A method for a wireless orthogonal frequency division multiplex, (OFDM) Long Term Evolution (LTE) transmitter configured for transmission of a first set of OFDM symbols using a base plurality of subcarriers having a base subcarrier frequency spacing defining a base symbol duration, the method comprising:
 transmitting, using the base plurality of subcarriers, a second set of OFDM symbols during one base symbol duration, each of the second set of OFDM symbols including a second Cyclic Prefix (CP) and having a second symbol duration smaller than the one base symbol duration, the first set of OFDM symbols being associated with a first radio access technology (RAT) having a first physical layer and the second set of OFDM symbols being associated with a second RAT having a second physical layer different from the first physical layer, the transmitting of the second set of OFDM signals being based on a predetermined set of modulation values for the base plurality of subcarriers, the predetermined set of modulation values corresponding to data associated with the second RAT; and
 the transmitting of the second set of OFDM signals including applying M Long Term Evolution, LTE, modulation values in the LTE transmitter to an M-point inverse fast Fourier transform, IFFT, to generate a Wi-Fi transmission recoverable at a Wi-Fi receiver by an N-point fast Fourier transform, FFT.

2. The method of claim 1 further comprising transmitting, using the base plurality of subcarriers, a first set of OFDM symbols, each of the first set of OFDM symbols including a base CP and having a base symbol duration.

3. The method of claim 2 wherein the first and second sets of OFDM symbols are transmitted in sequence, as one of contiguous transmissions and non-contiguous transmissions.

4. The method of claim 3 wherein the first and second sets of OFDM symbols are transmitted as non-contiguous transmissions separated by a delay and wherein the second set of OFDM symbols comprises data is indicative of a time for completing transmission of the first set of OFDM symbols.

5. The method of claim 1 further comprising transmitting, using the base plurality of subcarriers, a third set of OFDM symbols during one base symbol duration, each of the third set of OFDM symbols including a third CP and having a third symbol duration smaller than the base symbol duration.

6. The method of claim 1 wherein the first RAT is LTE and the second RAT is Wi-Fi.

7. The method of claim 1 wherein the transmitting of the second set of OFDM symbols is based on a predetermined OFDM signal in one of a time domain and a frequency domain, the predetermined ODFM signal containing data associated with the second OFDM communication protocol.

8. The method of claim 1 further comprising generating for transmission in the second set of OFDM symbols an OFDM signal in one of a time domain and a frequency domain, the OFDM signal being generated using a second plurality of subcarriers different from the base plurality of subcarriers, the second plurality of subcarriers having a second subcarrier frequency spacing defining the second symbol duration.

9. The method of claim 8 wherein the OFDM signal generated is associated with the second OFDM communication protocol, the method further comprising interpolating the OFDM signal generated using the base plurality of subcarriers to produce an OFDM signal to form the second set of OFDM symbols.

10. The method of claim 1 wherein the second set of OFDM symbols comprises control data associated with the second OFDM communication protocol, the control data being indicative of one of a transmission length, transmission time, transmission type and a channel reservation time associated with at least one of the first and second set of OFDM symbols.

11. The method of claim 10 wherein the control data comprises one of Short Training Field (STF) data, Long Training Field (LTF) data, Signal Field (SIG) data.

12. The method of claim 1 wherein the second set of OFDM symbols comprises packet data associated with the second OFDM communication protocol, the packet data being indicative of one of a transmission length, transmission time, transmission type and a channel reservation time associated with at least one of first and the second set of OFDM symbols.

13. The method of claim 12 wherein the packet data comprises a Clear To Send (CTS) frame having a timer value indicative of a transmission end time associated with the at least one of the first and the second set of OFDM symbols.

14. The method of claim 1 wherein the second set of OFDM symbols comprises an OFDM indication indicative of one of an OFDM type, OFDM mode and an OFDM parameter, a symbol duration, a CP duration, a number of subcarriers, a subcarrier spacing, a subcarrier modulation format, and a subcarrier frequency set associated with the first set of OFDM symbols.

15. An orthogonal frequency division multiplex (OFDM) Long Term Evolution(LTE) transmitter configured for transmission of a first set of OFDM symbols using a base plurality of subcarriers having a base subcarrier frequency spacing defining a base symbol duration, the OFDM transmitter comprising:
 circuitry containing instructions which, when executed, cause the transmitter to transmit, using the base plurality of subcarriers, a second set of OFDM symbols during one base symbol duration, each of the second set of OFDM symbols including a second Cyclic Prefix (CP) and having a second symbol duration smaller than the one base symbol duration, the first set of OFDM symbols being associated with a first radio access technology (RAT) having a first physical layer and the second set of OFDM symbols being associated with a second RAT having a second physical layer different from the first physical layer, the transmitting of the second set of OFDM symbols being based on a predetermined set of modulation values for the base plurality of subcarriers, the predetermined set of modulation values corresponding to data associated with the second RAT; and the transmitting of the second set of OFDM signals including applying M Long Term Evolution (LTE) modulation values in the LTE transmitter to an M-point inverse fast Fourier transform (IFFT) to generate a Wi-Fi transmission recoverable at a Wi-Fi receiver by an N-point fast Fourier transform (FFT).

16. The OFDM transmitter of claim 15 wherein the instructions are further configured to cause the transmitter to transmit, using the base plurality of subcarriers, a first set of OFDM symbols, each of the first set of OFDM symbols including a first CP and having a first symbol duration equal to the base symbol duration.

17. The OFDM transmitter of claim 16 wherein the first and second sets of OFDM symbols are transmitted in sequence, as one of contiguous transmissions and non-contiguous transmissions.

18. The OFDM transmitter of claim 17 wherein the first and second sets of OFDM symbols are transmitted as non-contiguous transmissions separated by a delay and wherein the second set of OFDM symbols comprises data is indicative of a time for completing transmission of the first set of OFDM symbols.

19. The OFDM transmitter of claim 15 wherein the instructions are further configured to cause the transmitter to transmit, using the base plurality of subcarriers, a third set of OFDM symbols during one base symbol duration, each of the third set of OFDM symbols including a third CP and having a third symbol duration smaller than the base symbol duration.

20. The OFDM transmitter of claim 15 wherein the first RAT is LTE and the second RAT is WiFi.

21. The OFDM transmitter of claim 15 wherein the instructions are configured to cause the transmitter to transmit the second set of OFDM symbols based on a predetermined OFDM signal in one of a time domain and a frequency domain, the predetermined ODFM signal containing data associated with the second OFDM communication protocol.

22. The OFDM transmitter of claim 15 wherein the instructions are further configured to cause the transmitter to generate for transmission in the second set of OFDM symbols an OFDM signal in one of a time domain and a frequency domain, the OFDM signal being generated using a second plurality of subcarriers different from the base plurality of subcarriers, the second plurality of subcarriers having a second subcarrier frequency spacing defining the second symbol duration.

23. The OFDM transmitter of claim 22 wherein the OFDM signal generated is associated with the second OFDM communication protocol, and wherein the instructions are further configured to cause the transmitter to interpolate the OFDM signal generated using the base plurality of subcarriers to produce an OFDM signal to form the second set of OFDM symbols.

24. The OFDM transmitter of claim 15 wherein the second set of OFDM symbols comprises control data associated with the first OFDM communication protocol, the control data being indicative of one of a transmission length, transmission time, transmission type and a channel reservation time associated with at least one of the first and second set of OFDM symbols.

25. The OFDM transmitter of claim 24 wherein the control data comprises one of Short Training Field (STF) data, Long Training Field (LTF) data, Signal Field (SIG) data.

26. The OFDM transmitter of claim 15 wherein the second set of OFDM symbols comprises packet data associated with the second OFDM communication protocol, the packet data being indicative of one of a transmission length, transmission time, transmission type and a channel reservation time associated with at least one of first and the second set of OFDM symbols.

27. The OFDM transmitter of claim 26 wherein the packet data comprises a Clear To Send (CTS) frame having a timer value indicative of a transmission end time associated with the at least one of the first and the second set of OFDM symbols.

28. The OFDM transmitter of claim 15 wherein the second set of OFDM symbols comprises an OFDM indication indicative of one of an OFDM type, OFDM mode and an OFDM parameter, a symbol duration, a CP duration, a number of subcarriers, a subcarrier spacing, a subcarrier modulation format, and a subcarrier frequency set associated with the first set of OFDM symbols.

* * * * *